(12) United States Patent  
Riley et al.

(10) Patent No.: US 10,215,243 B2
(45) Date of Patent: *Feb. 26, 2019

(54) BRAKE SYSTEM AND APPARATUS

(75) Inventors: Brian Michael Riley, Sacramento, CA (US); Andrew Ouellet, Alameda, CA (US); Peter Reimer, Los Altos, CA (US)

(73) Assignee: Syscend, Inc., Irvine, CA (US)

( * ) Notice: Subject to any disclaimer, the term of this patent is extended or adjusted under 35 U.S.C. 154(b) by 422 days.

This patent is subject to a terminal disclaimer.

(21) Appl. No.: 13/513,141

(22) PCT Filed: Dec. 15, 2010

(86) PCT No.: PCT/US2010/060411
§ 371 (c)(1),
(2), (4) Date: Jul. 9, 2012

(87) PCT Pub. No.: WO2011/075502
PCT Pub. Date: Jun. 23, 2011

(65) Prior Publication Data
US 2012/0279811 A1 Nov. 8, 2012

Related U.S. Application Data

(63) Continuation-in-part of application No. 12/638,944, filed on Dec. 15, 2009, now Pat. No. 8,333,266.
(Continued)

(51) Int. Cl.
*B62L 3/08* (2006.01)
*F16D 55/224* (2006.01)
(Continued)

(52) U.S. Cl.
CPC ........ *F16D 55/2245* (2013.01); *B60T 8/3225* (2013.01); *B60T 8/52* (2013.01);
(Continued)

(58) Field of Classification Search
CPC ...... B60T 11/046; B60T 11/06; B60T 13/065; B62L 3/08; B62L 3/00; B62L 3/02; B62L 1/12
(Continued)

(56) References Cited

U.S. PATENT DOCUMENTS 662,602 A * 11/1900 Schmidt et al. ...... B60T 13/065
188/140 R
3,842,946 A * 10/1974 Blevens ...................... 188/24.16
(Continued)

*Primary Examiner* — Bradley T King
*Assistant Examiner* — Stephen M Bowes
(74) *Attorney, Agent, or Firm* — Staniford Tomita LLP

(57) ABSTRACT

A braking system includes a brake pad that is coupled to a slider assembly that moves linearly within a guide. The slider assembly and guide are coupled to a first brake. A second brake actuator is coupled to the slider assembly, the guide and a second brake. When the first brake is actuated, the slider assembly is pressed against a rotating braking surface and the friction of the brake pad against the rotating braking surface can cause the slider assembly to move within the guide which actuates the second brake actuator. The second brake actuator then actuates the second brake. When the first brake is released, the slider assembly is removed from the rotating braking surface and the second brake actuator is released which releases the second brake.

11 Claims, 23 Drawing Sheets

Related U.S. Application Data

(60) Provisional application No. 61/411,405, filed on Nov. 8, 2010.

(51) Int. Cl.
　　*B60T 8/32*　　　(2006.01)
　　*B60T 8/52*　　　(2006.01)
　　*B60T 11/06*　　(2006.01)
　　*F16D 127/12*　 (2012.01)

(52) U.S. Cl.
　　CPC .............. *B60T 11/06* (2013.01); *B62L 3/08* (2013.01); *F16D 2127/12* (2013.01)

(58) Field of Classification Search
　　USPC ..... 188/24.11, 24.12, 24.16, 24.22; 303/9.64
　　See application file for complete search history.

(56) References Cited

U.S. PATENT DOCUMENTS

| | | | |
|---|---|---|---|
| 4,015,690 A * | 4/1977 | Armstrong ............. | B62L 1/16 188/24.15 |
| 5,431,257 A * | 7/1995 | Rocca et al. ............ | 188/24.21 |
| 2005/0000756 A1* | 1/2005 | Biria ..................... | B60T 8/261 188/26 |

\* cited by examiner

BRAKE SYSTEM AND APPARATUS

CROSS REFERENCE TO RELATED APPLICATIONS

This application claims priority to U.S. patent application Ser. No. 12/638,944, filed 15 Dec. 2009 and U.S. Provisional Application Ser. No. 61/411,405, filed 8 Nov. 2010, both of which are herein incorporated by reference.

BACKGROUND

1. Field of Invention

The present invention relates to a brake system and method. More particularly, the present invention relates to a brake system and method for a two-wheeled vehicle.

2. Description of Related Art

A two-wheeled vehicle is equipped with a brake system to slow or stop its moving by applying friction upon its wheels. A rider uses both hands to press two brake levers, fixed on the handlebar, to control a front and rear brake of the two-wheeled vehicle. However, it would be dangerous if the rider presses either one of the brake levers too hard to make the vehicle's wheel to be locked by the front or rear brake. It is uncontrollable and dangerous for a moving two-wheeled vehicle with one of its wheels being locked, e.g. the vehicle may skid on the ground. In the instance of a two-wheeled vehicle's tip over, the two-wheeled vehicle still moves with its front wheel being locked such that the rider may fall over beyond a handlebar of the two-wheeled vehicle when a rear wheel comes off the ground by a sufficient height. For the foregoing reasons, there is a need for preventing a moving two-wheeled vehicle from a tip-over or a wheel being locked.

SUMMARY

The present invention is directed towards a braking system that can include two or more brake mechanisms that are actuated by one or more brake controls, such as hand brake levers or foot brake pedals. When the user squeezes the one or more brake levers, a first brake actuator actuates one of the brakes. The friction force of the brake against a rotating structure then actuates a second brake actuator coupled to the second brake so that both brakes are engaged to slow or stop the vehicle. The first brake that is directly controlled by the brake lever can be any brake on a vehicle.

The following description is primarily directed towards a two wheeled bicycle in which the first brake is the rear brake and the second brake is the front brake. However, this configuration is exemplary embodiments of the invention. These same designs and operating principles can be applied to any multiple wheeled vehicle and the first brake can be any brake on the vehicle. The scope of the application is intended to cover the inventive braking system applied to all of these different vehicle configurations.

In an embodiment of the present invention, the brake pad is slidably connected to at least one of the two brake arms along a direction generally in parallel with the pivot axis of the brake arms. The rear brake further includes a slider assembly slidably connected with a guide, the brake pad can be secured to the slider assembly and a sliding portion of the slider assembly can slide against the guide that is fastened to one of the brake arms. The first brake can be controlled by a first brake actuator. In an embodiment, the first brake actuator can be a brake lever which is coupled to the handlebar and controlled by the rider's hand. The first brake lever can be actuated by the rider's fingers squeezing the first brake lever against the handlebar.

A first brake cable can be at least partially within a first brake cable housing. The first brake cable can be connected between the first brake lever and the first brake. The first brake actuator can run along or within the bicycle frame and the ends of the first brake actuator can be coupled to the brake lever and the first brake. In an embodiment, the first brake actuator can be a brake cable within a brake cable housing. When the brake lever is actuated, the cable can be pulled towards the brake lever within a rear brake cable housing placing the cable in tension and the brake cable housing in compression. The movement of the rear brake cable can cause the first brake to be actuated.

In another embodiment, the brake actuators can be hydraulic mechanisms. The brake lever and the first brake can be coupled to a hydraulic tube filled with an incompressible hydraulic fluid, then the brake lever is actuated and piston can be moved within a cylinder increasing the pressure of the hydraulic fluid. The increased pressure causes the hydraulic fluid to move towards the first brake within the tubing. The first brake can also be coupled to a piston and cylinder assembly and the increased pressure can cause the piston to move within the cylinder actuating the first brake.

The actuation of the rear brake normally includes squeezing a rotating structure between two brake pads. The friction of the brake pads against the rotating structure causes the rear wheel to rotate more slowly or stop the rotation all together. The rotating structure can be the sidewalls of the rear wheel rim or a disk that is coupled to the rear wheel.

The first brake can be coupled to a second brake actuator which is coupled to and controls a second brake. In an embodiment, the second brake actuator can include a second brake cable and a cable housing that surrounds at least a portion of the cable. The second brake cable can be coupled to the slider assembly and the guide can be coupled to a noodle that is a rigid tube that can be bent. The noodle can then be coupled to the front brake cable housing. In another embodiment, the front brake cable can be coupled to the guide and the front brake cable can be coupled to the front brake cable housing. When the first brake is actuated, the brake pad contacts the rotating structure and moves within the slider. This movement creates tension in the brake cable and compression of the brake cable housing. The movement of the brake cable causes the second brake to be actuated.

In a hydraulic embodiment, the first brake can be coupled to a piston and cylinder and the second brake actuator can be a hydraulic tube filled with hydraulic fluid. A piston can be coupled to the slider assembly and the slider assembly can move during braking of the first brake. The slider assembly movement can cause the piston to move in the cylinder pressurizing the hydraulic fluid. The second brake can be coupled to the tube and the increased pressure can cause a second brake piston to move within a second brake cylinder which then actuates the second brake. Like the first brake, when the second brake is actuated, a rotating structure is squeezed between two brake pads which slow or stop the rotation.

In an embodiment, the first brake is the rear brake of a bicycle and the second brake is the front brake. The inventive brake system is able to prevent a front brake from being locked regardless of how much force is applied to the braking lever(s). The inventive braking system may also permit the rider to use either one hand to actuates single brake lever or two hands to actuate two brake levers to simultaneously actuate the front and rear brakes.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
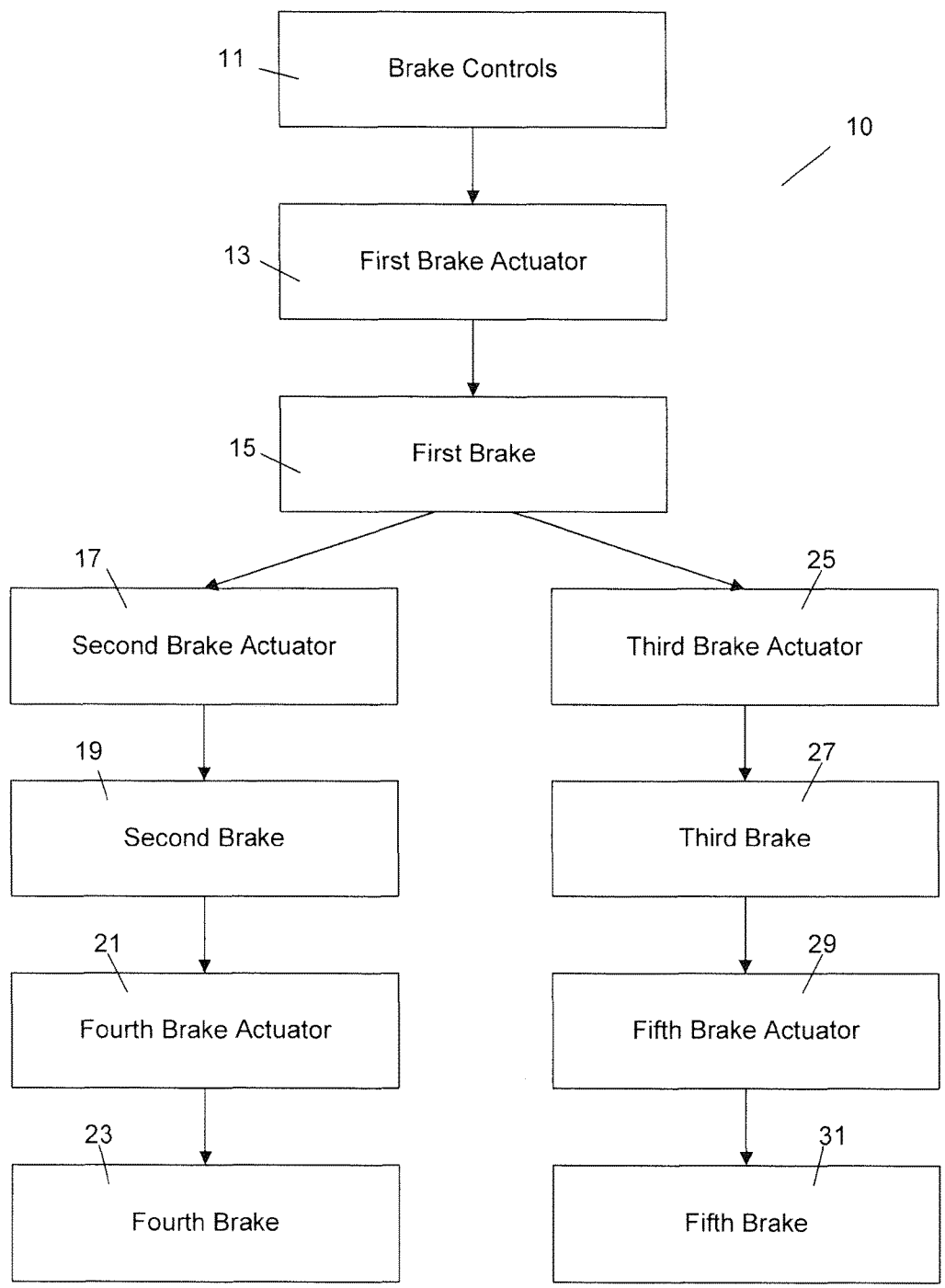
FIG. 1 illustrates a block diagram of an embodiment of the inventive braking system.

Reference will now be made in detail to the present embodiments of the invention, examples of which are illustrated in the accompanying drawings. Wherever possible, the same reference numbers are used in the drawings and the description to refer to the same or like parts. With reference to FIG. 1, the present invention is directed towards a brake system 10 that can be used for bicycles and other vehicles supported by multiple wheels. The inventive braking system 10 that can include two or more brake mechanisms 15, 19, 23, 27, 31 that are actuated by one or more brake controls 11, such as hand brake levers or foot brake pedals. When the user squeezes the one or more brake levers or steps on the foot brake pedal, a first brake actuator 13 actuates the first brake 15. The friction force of a brake pad in the first brake 15 against a rotating structure then actuates a second brake actuator 17 coupled to the second brake 19 so that both brakes 15, 19 are engaged to slow or stop the vehicle. The first brake 15 that is directly controlled by the brake controls 11 can be any brake on a vehicle.

The inventive brake system can be used on any wheel supported vehicle having multiple brakes. For example, a two wheeled vehicle can include a front brake and a rear brake. The brake system on a three wheeled vehicle can include a front center brake, a left rear brake and a right rear brake. Alternatively, a three wheeled vehicle can include a left front brake, a right front brake and a center rear brake. On a four wheeled vehicle, the brake system can include a front left brake, a front right brake, a left rear brake and a right rear brake.

These brakes can be sequentially coupled in any order. For example, if the first brake 15 is the front brake, the brake control 11 can be coupled to the front (first) brake 15 by a front (first) brake actuator 13 and the front (first) brake 15 can be coupled to the rear (second) brake 19 by a rear (second) brake actuator 17. Conversely, if the first brake 15 is the rear brake, the brake control 11 can be coupled to the rear (first) brake 15 by a rear (first) brake actuator 13 and the front (second) brake actuator 17 can be coupled between the rear (first) brake 15 and the front (second) brake 19. In other embodiments, the vehicle may have left and right brakes. The first brake 15 can be the right brake and the second brake 19 can be the left brake.

It is also possible for the first brake to control multiple brake actuators 17, 25. For example, a first (rear) brake 15 can be coupled to a second (front left) brake actuator 19 can control the second (front left) brake 19 and a third (front right) brake actuator 25 can control the third (front right) brake 27 of the vehicle. It is also possible to extend the number of sequential brakes. For example, the brake controls 11 can actuate the first brake actuator 13 which is coupled to the first brake 15. The braking friction of the first brake 15 can actuate a second brake actuator 17 coupled to the second brake 19. The braking friction of the second brake 19 can actuate a fourth brake actuator 21 coupled to a fourth brake 23. Similarly, the braking friction of the third brake 27 can actuate the fifth brake actuator 29 coupled to a fifth brake 31. This sequential brake actuator configuration can continue to three or more brakes.

The following description is primarily directed towards a two wheeled bicycle in which the first brake is the rear brake and the second brake is the front brake. However, these same designs and operating principles can be applied to any multiple wheeled vehicle and the scope of the application is intended to cover the inventive braking system applied to all multiple wheeled vehicle configurations.

Normal bicycle brakes include two hand levers which are used to individually control a front brake and a rear brake. A problem with existing brake systems is that the bicycle rider must be careful when applying the brakes because if the front brake is locked, the stopping force can flip the rider off of the bicycle. There are several techniques for efficient braking on a two-brake bicycle. The one most commonly taught is the 25-75 technique. This method entails supplying 75% of the stopping power to the front brake, and about 25% of the power to the rear. Since the bicycle's deceleration causes a transfer of weight to the front wheel, there is much more traction on the front wheel. However, excessive front braking force can cause skidding of the front tire which can cause the bike to flip forward over the front wheel and probably injury to the rider. Excessive rear braking force can cause skidding, but will not result in the bike flipping.

The present invention is directed towards a brake system and apparatus which allows the rider to quickly stop the bicycle or other vehicle very quickly, but prevents the front wheel from locking up or being slowed too quickly. The brake system is also compatible with existing brake designs and can be produced in a very economical manner so that bicycle riders will not have to pay a significant amount of money for these very important safety features. In an embodiment, the inventive brake system can be retrofitted onto existing bicycle brakes and in other embodiments, the inventive brake system can be incorporated into the designs of the brakes.

Figure 2:
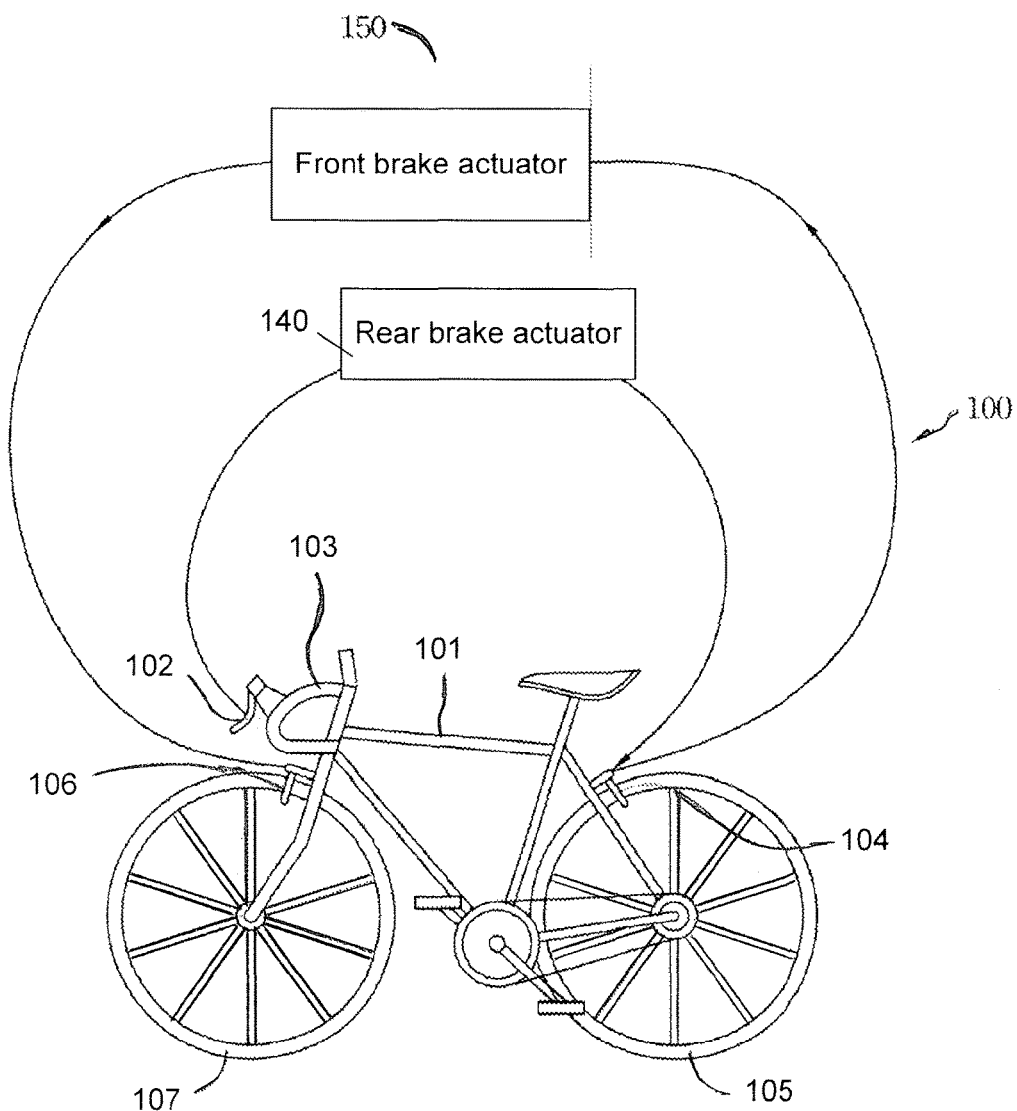
FIG. 2 illustrates bicycle having the inventive braking system according to an embodiment of the invention.

With reference to FIG. 2, a bicycle having the inventive braking system is illustrated. The bicycle 100 has a frame 101 on which a front wheel 107 and a rear wheel 105 are rotatably mounted. In an embodiment, one or two brake levers 102 are fastened on a handlebar 103 and the lever(s) 102 are connected to a rear brake actuator 140 which is coupled to a rear brake 104. A front brake actuator 150 is coupled between the front brake 106 and the rear brake 104. The rear brake 104 can include one or two inventive brake pad assemblies. When the rear brake 104 is actuated by the brake lever(s) 102 a portion of the rotating rear wheel 105 (or other braking surface) is compressed between two or more brake pads and the friction generated by the direct contact of the brake pad with the rotating braking surface slows the rotational velocity of the rear wheel. One or more of the brake pads in the rear brake 104 can include an inventive brake pad assembly. In response to the direct contact between the brake pads with the rotating braking surface, inventive brake pad assembly actuates the front brake actuator 150 which causes the front brake 106 to be applied to the front wheel 107 or other front wheel braking surface. When the rear brake 104 is released, the brake pad assembly is pulled away from the rear wheel 105 and the brake pad assembly releases the front brake actuator 150 which releases the front brake 106.

If the braking occurs quickly, the weight of the rider can shift forward and the deceleration force applied by the front wheel 107 at the point of contact with the ground can cause the rear wheel 105 to be lifted from the ground. This loss of surface contact will reduce or eliminate the rotational force applied by the ground to the rear wheel 105. Because the actuation force applied to the front brake 106 is proportional to the rotational force of the rear wheel 105, the braking force applied to the front wheel 107 will also be reduced until the rear wheel 105 regains contact with the ground. The contact will generate a rotational force to the rear wheel 105 and the inventive brake pad assembly will be actuated again and apply more force to the front brake 106. By automatically detecting the rotational force applied to the rear wheel 105 and adjusting the front brake 106 force proportionally, the inventive braking system and brake pad assembly prevents the front wheel 106 from skidding which allows the rider to remain in control of the bicycle even if excessive braking forces are applied. Since the front brake 106 force is controlled to the rear wheel rotational force 105, a rider can increase the braking force by moving as much body weight over the rear wheel 105 as possible during braking. However, even if the rider shifts his or her weight forward while riding, hard braking will not cause the bicycle to stop in a manner that would flip the bicycle over the front wheel 107.

Figure 3:
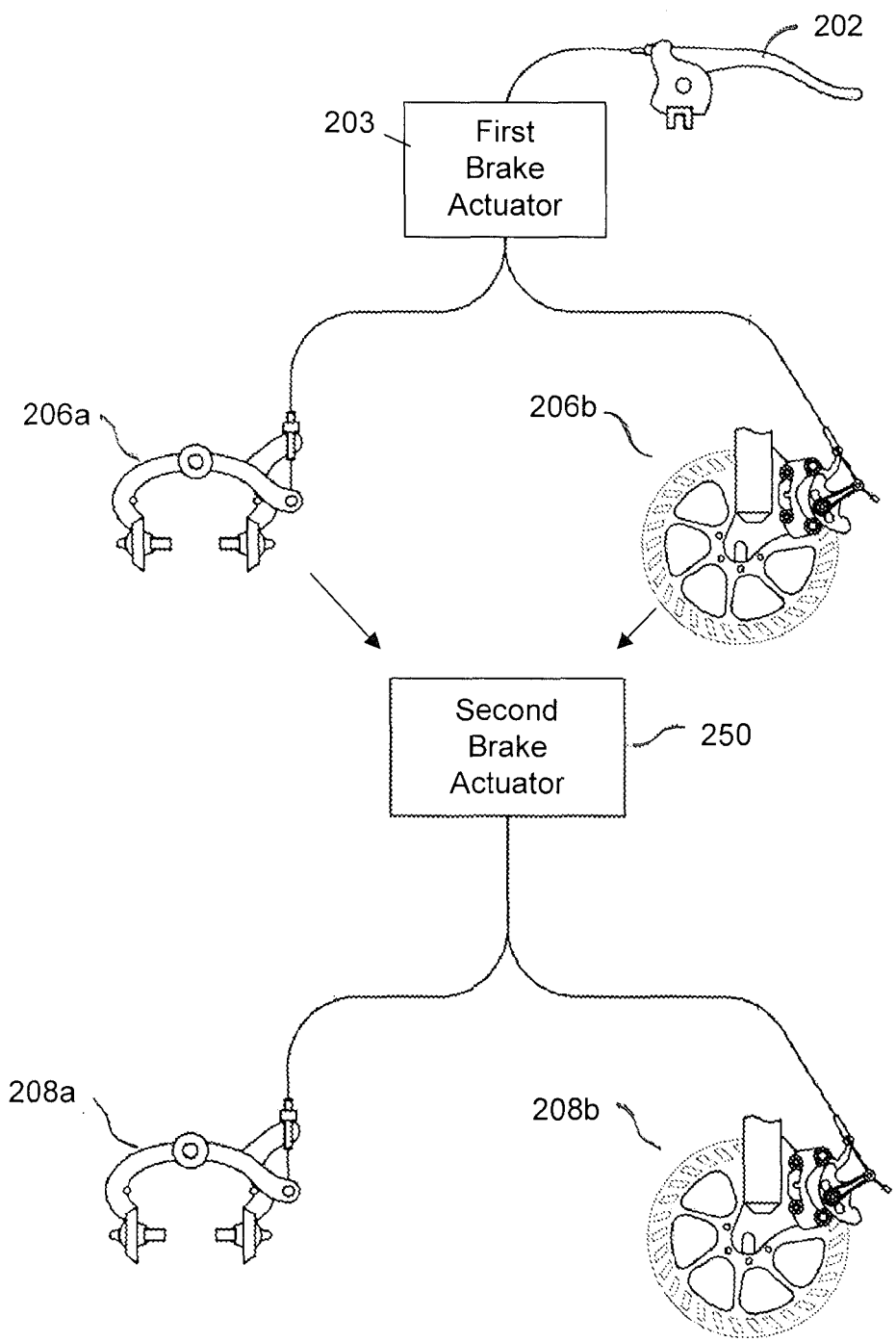
FIG. 3 illustrates a brake system according to an embodiment of the invention.

FIG. 3 illustrates a brake system according to one embodiment of this invention. The brake system can include a brake lever(s) 202, a first brake actuator 203, a first brake which can be a rim brake 206a, a disk brake 206b or other type of brake, a second brake actuator 250 and a second brake which can be a rim brake 206a, a disc brake 206b or any other brake mechanism. When the brake lever 202 is squeezed, it transfers a braking force to the first brake actuator 203 which applies the first brake 206a or 206b. The friction force of the brake pad assembly in the first brake 206a, 206b transmits a braking force to the second brake actuator which actuate the second brake 208a or 208b.

Figure 4:
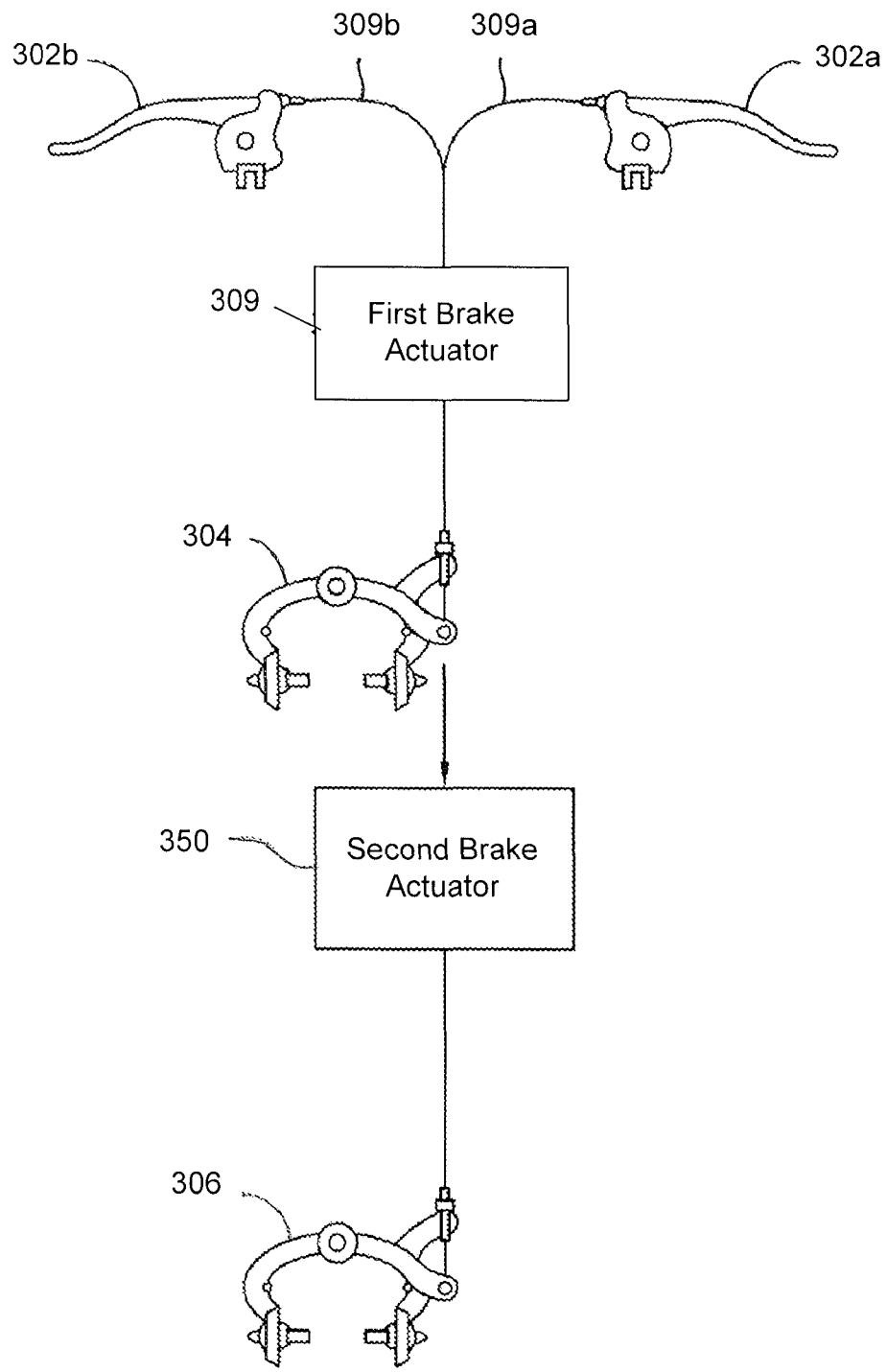
FIG. 4 illustrates a brake system according to another embodiment of the invention.

FIG. 4 illustrates a brake system according to another embodiment of this invention. The brake system may include two brake levers 302a, 302b, a first brake actuator 309, a first brake 304, a second brake actuator 350 and a second brake 306. In this embodiment, two brake levers 302a, 302b are used to actuate the first brake 304. In an embodiment, the first brake actuator 309 can be a cable that can be split into a first brake cable 309a and a second brake cable 309b. This configuration divides the first brake actuation force between the first brake cable 309a and the second brake cable 309b which are respectively pulled by a first brake lever 302a and a second brake lever 302b. In this configuration, a rider may use both hands to apply brake forces on the two brake levers 302a, 302b to actuate the rear brake 304.

However, the operator can still use either one of the two brake levers 302a, 302b alone and individually to actuate the first brake 304. When the first brake is actuated, the movement of one or more of the brake pads in the inventive brake pad assembly will actuate the second brake actuator 350 which transfers a brake force to the second brake 306. Although, caliper brakes 304, 306 are illustrated, any other type of brake can be used.

Figure 5:
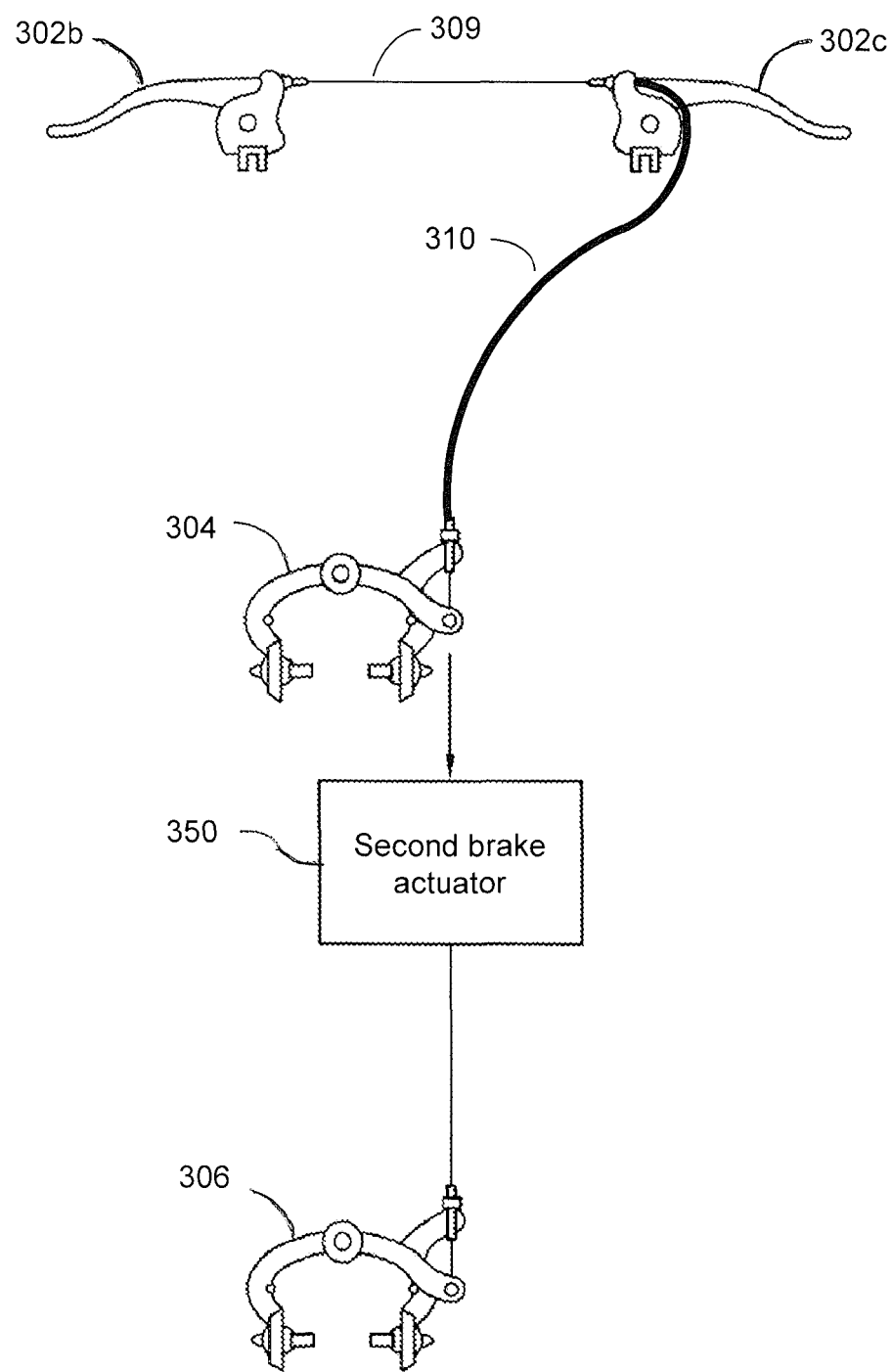
FIG. 5 illustrates a brake system according to another embodiment of the invention.

In some embodiments, the brake actuators can be brake cables surrounded by brake cable housings. The brake actuators can be actuated by pulling the cables through the brake cable housing, such that the brake cable is under tension and the brake cable housing is under compression. The brakes can be actuated by either pulling the brake cables away from the brake or pushing the brake cable housing towards the brake. With reference to FIG. 5, in an embodiment, two brake levers 302a and 302c can be coupled to a first brake actuator that includes a brake cable 309 and a brake cable housing 310 that surrounds a portion of the brake cable 309. The brake lever 302a, can be coupled to the brake cable 309 such that when actuated, the brake cable 309 is pulled towards the brake lever 302a and away from the first brake 304. The brake lever 302c is coupled to the brake cable housing 310. When the brake lever 302c is actuated, the brake cable housing 310 is pushed towards the first brake 304. Again, the brake levers 302a, 302c can be operated independently to actuate the rear brake 304. The friction force against one or more of the rear brake pads can actuate the second brake actuator 350 which transmits a brake force to the second brake 306 helping to stop the vehicle.

Figure 6:
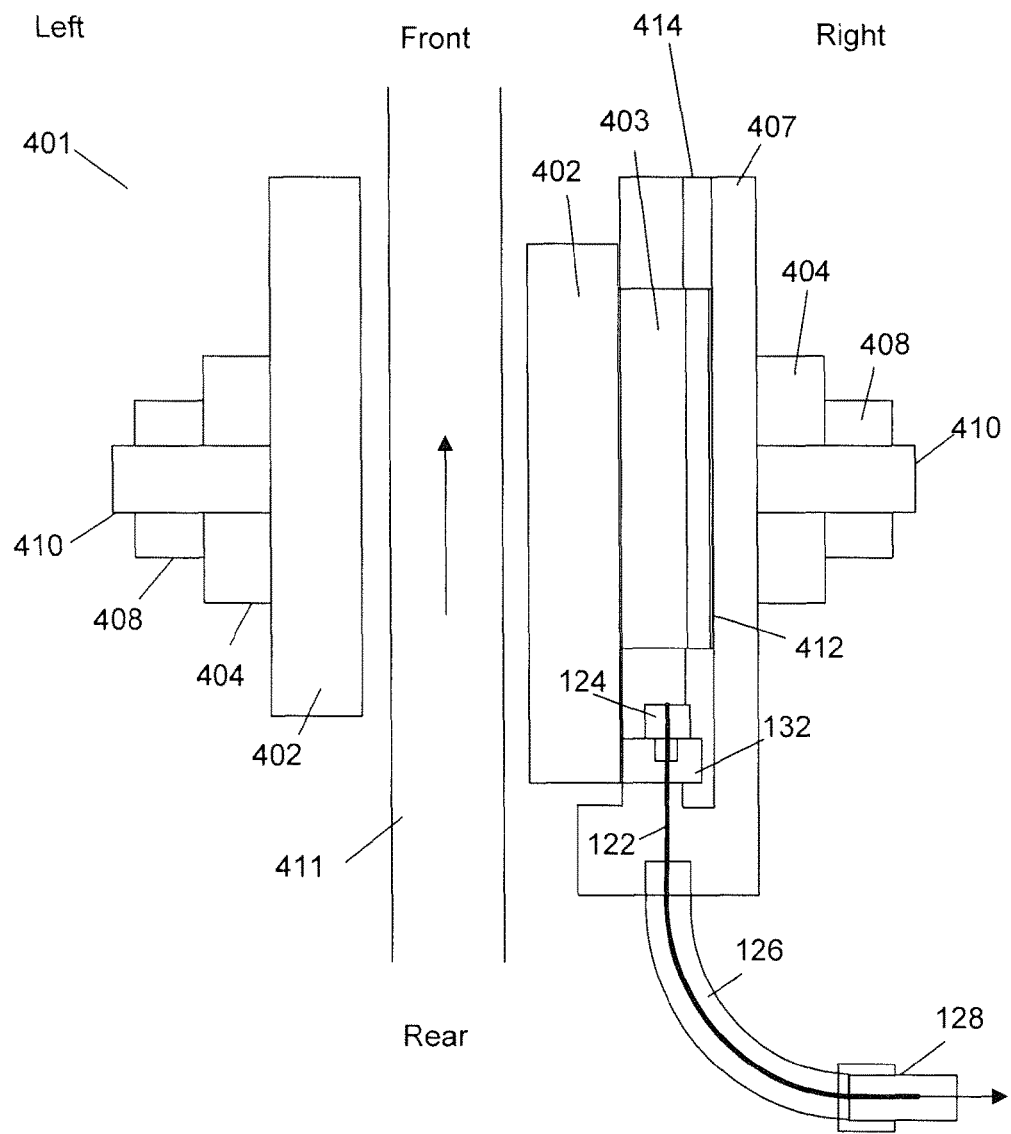
FIGS. 6 and 7 illustrate top views of a brake according to an embodiment of the invention.

With reference to FIG. 6, a top cross sectional view of an embodiment of a first brake 401 having the inventive brake assembly 414 is illustrated. The brake 401 can include a slider assembly 403 and a guide 407 that are coupled to an arm 404 of the first brake 401. The brake pad assembly 414 can include a slider assembly 403 that can slide within the guide 407. The brake 401 can be mounted around a portion of the first wheel with the brake pads 402 aligned on opposite sides of a first wheel rim 411. When the vehicle moves forward, the upper portion of the rim 411 also moves forward. The brake 401 can have two brake pads 402. In an embodiment, the brake pad 402 on the right side is coupled to a slider assembly 403 that moves within a guide 407. The guide 407 can be coupled to a mounting rod 410 which is secured to the brake arm 404. The slider assembly 403 can include a brake pad 402 which can be compressed against the rotating rim 411. The brake pad assembly 403 can also include a layer of lubricious material 412 such as Nylatron, Teflon, graphite or other low coefficient of friction and high compression strength materials. Alternatively, the brake assembly 403 components can be made of these low friction materials.

The orientation of the slider assembly 403, brake pad 402 and guide 407 on the bicycle can depend upon the position of the brake 401 on the wheel. If the brake 401 is located on the upper half of the rim 411, the described and illustrated positions are correct. However, if the brake is on the lower half of the rim 411, the "front" and "back" of the bicycle can be reversed.

The slider assembly 403 can also be coupled to a second brake actuator. In an embodiment, the second brake actuator can be a cable 122 having an end fitting 124 which can have a stepped cylindrical design with a first smaller diameter and a larger end diameter. The fitting 124 can engage an open hole coupling mechanism 132 on the slider 403. The hole in the coupling mechanism 132 can be slightly larger than the first smaller diameter and smaller than the larger end diameter so that the fitting 124 is securely connected to the coupling mechanism 132.

The guide 407 can have a feature that engages the end of a brake cable "noodle" 126 which is rigid section of tubing that functions as a low friction guide for the brake cable 122. In an embodiment, the guide 407 can have a counter bored recess which has an inner diameter that is slightly larger than the outer diameter of the end of the noodle 126. In other embodiments, the end of the noodle 126 can be inserted into a ferrule that can be a metal or plastic piece that surrounds the outer diameter and end of the noodle 126 and has a hole for the brake cable 126 to protrude through.

The guide can also have a threaded mechanism that allows the brake pads 402 of the second brake to be adjusted in the released state by effectively controlling the length of the second brake cable housing 128. In an embodiment, the brake cable housing 128 includes a barrel adjuster which allows the user to effectively adjust the length of the cable housing 128. If the brake is too tight and additional clearance is required, the barrel adjuster is adjusted to effectively shorten the cable housing 128 length. Conversely, if the second brake is too loose, the barrel adjuster can be adjusted to effectively lengthen the cable housing 128 length. The barrel adjuster can be located at any portion of the brake cable housing 128, including at the intersection with the inventive brake pad assembly. The brake pads 402 will rest close to the second rim if the cable housing 128 is lengthened and conversely, if the brake cable 126 is shortened, the brake pads 402 on the second brake will rest farther away from the rim 411 in the normal open position.

The other end of the noodle 126 opposite the side in contact with the guide 407 can be connected to an end of the brake cable housing 128. The end of the noodle 126 can include an outer sleeve that surrounds the outer diameter of the cable housing 128 and an inner edge that engages the end of the brake cable housing 128. The noodle 126 can allow the brake cable 126 to bend so that the brake cable can be directed in any desired direction, preferably towards the second brake. In an embodiment, another noodle can be coupled to the second brake and used to direct the brake cable 128 in the desired direction. The end of the brake cable 128 can be secured to the second brake with a "pinch bolt" mechanism which surrounds and secures the brake cable 128 to the second brake. In other embodiments, noodles may not be necessary and the brake cable housing 128 may be in direct contact with the first brake guide 407 and/or the second brake. The cable housing 128 can extend the entire length of the brake cable 126 or only be used over one or more sections of the brake cable 126. For example, in many bicycles, the cable housing 128 may be secured to stationary stops coupled to the ends of the top tube and the bare brake cable 128 may extend along or inside the top tube. If the second brake cable 128 is used to actuate a mechanical front disk brake, the second brake cable 128 can extend down an arm of the front fork.

The brake pad 402 on the left side of the rim 411 can be a normal brake pad. In an embodiment, the brake pad 402 is coupled to a threaded mounting rod 410 that extends away from the braking surface. The brake pad 402 can be secured to the brake arm 404 by tightening a nut 408 that is screwed onto the mounting rod 410. In this configuration, the brake pad 402 coupled directly to the threaded mounting rod 401 remains stationary relative to the arm 404 when the rear brake 401 is actuated. When the brake 401 is not actuated, the brake pads 402 are pulled away from the rim 411 by springs in the brake 401. In other embodiments, the brake pads can both have the inventive brake pad 414 assemblies.

Figure 7:
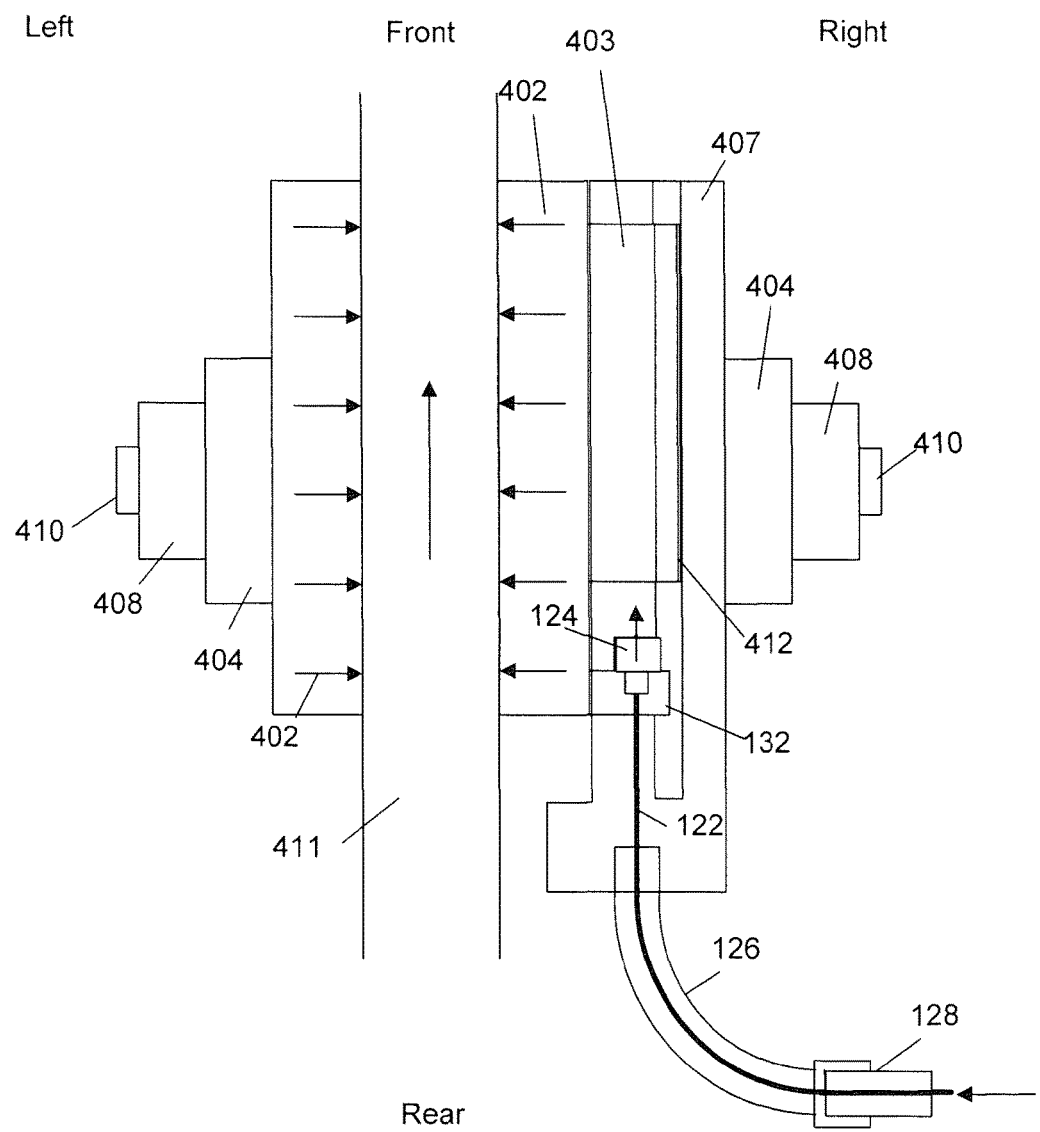

With reference to FIG. 7, the first brake 401 is coupled to a brake actuator which can be a brake lever(s). When the lever(s) is actuated, the inventive brake pad assembly 414 is pressed against the rim 411 of the wheel (or a rotating disk brake) coupled to the wheel to slow or stop the rotation. The rim brake pad 402 of the inventive brake pad assembly 414 can have an elongated shape like a normal brake pad. The slider assembly 403 and guide 407 are aligned with the brake pad 402 and rim 411 so that the movement of the slider 403 and brake pad 402 are also aligned with the rim 411 of the wheel.

When the first brake 401 is actuated, the slider assembly 403 and brake pad 402 are pressed against the rotating rim 411 and the movement of the rim 411 causes the slider assembly 403 and brake pad 402 to slide forward in the guide 407 towards the front of the bicycle. The coupling mechanism 132 is connected to the fitting 124 on the end of the brake cable 122. The movement of the slider assembly 403 will be greater than the spring force of the second brake and will cause the brake cable 122 to be pulled in tension. The noodle 126 is coupled to the guide 407 and the tension on the brake cable 122 will result in compression of the noodle 126 and the brake cable housing 128. The brake cable 122 and housing 128 are also coupled to the second brake. The movement of the brake cable 122 within the housing 128 will actuate the second brake.

The brake cable 122 tension force can be proportional to the friction force of the brake pad 402 against the moving rim 411. A higher braking force applied to the first brake will result in a higher braking force applied to the second brake through the brake cable 122.

However, if the rim 411 loses traction with the road, the rim 411 may stop rotating and the friction force that creates the force that pulls on the brake cable 122 and the brake force applied to the second brake are reduced until the rim 411 regains traction and begins to rotate again. Since the rim 411 may lose traction when excessive braking is applied to the front brake the rear wheel is starting to lift off the ground, this system effectively functions as an anti-locking brake system.

Figure 8:
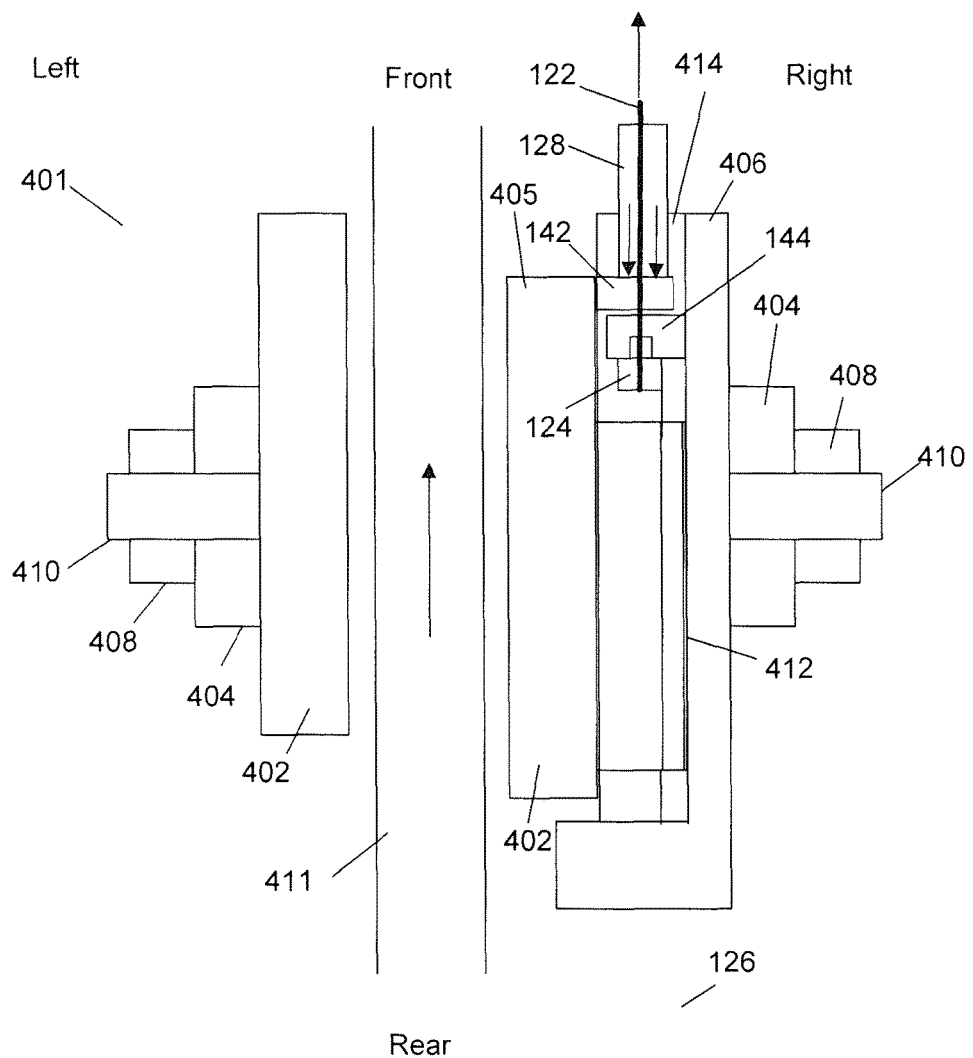
FIGS. 8 and 9 illustrate top views of another brake according to an embodiment of the invention.

With reference to FIG. 8, in an embodiment, the second brake actuator can be brake cable 122 in a brake cable housing 128. The brake cable 122 can have an end fitting 124 which is attached to the guide 406 at a coupling mechanism 144. The end of the brake cable housing 128 can butt up against a tab 142 coupled to the slider assembly 405. This is similar to the brake pad assembly illustrated in FIGS. 6 and 7. However, the action is reversed since the brake cable 122 can be coupled to the guide 406 and the brake cable housing 128 can be coupled to the slide assembly 405. The compression of the brake cable housing holds the brake pad assembly towards the back of the guide while the brake is in the open position.

Figure 9:
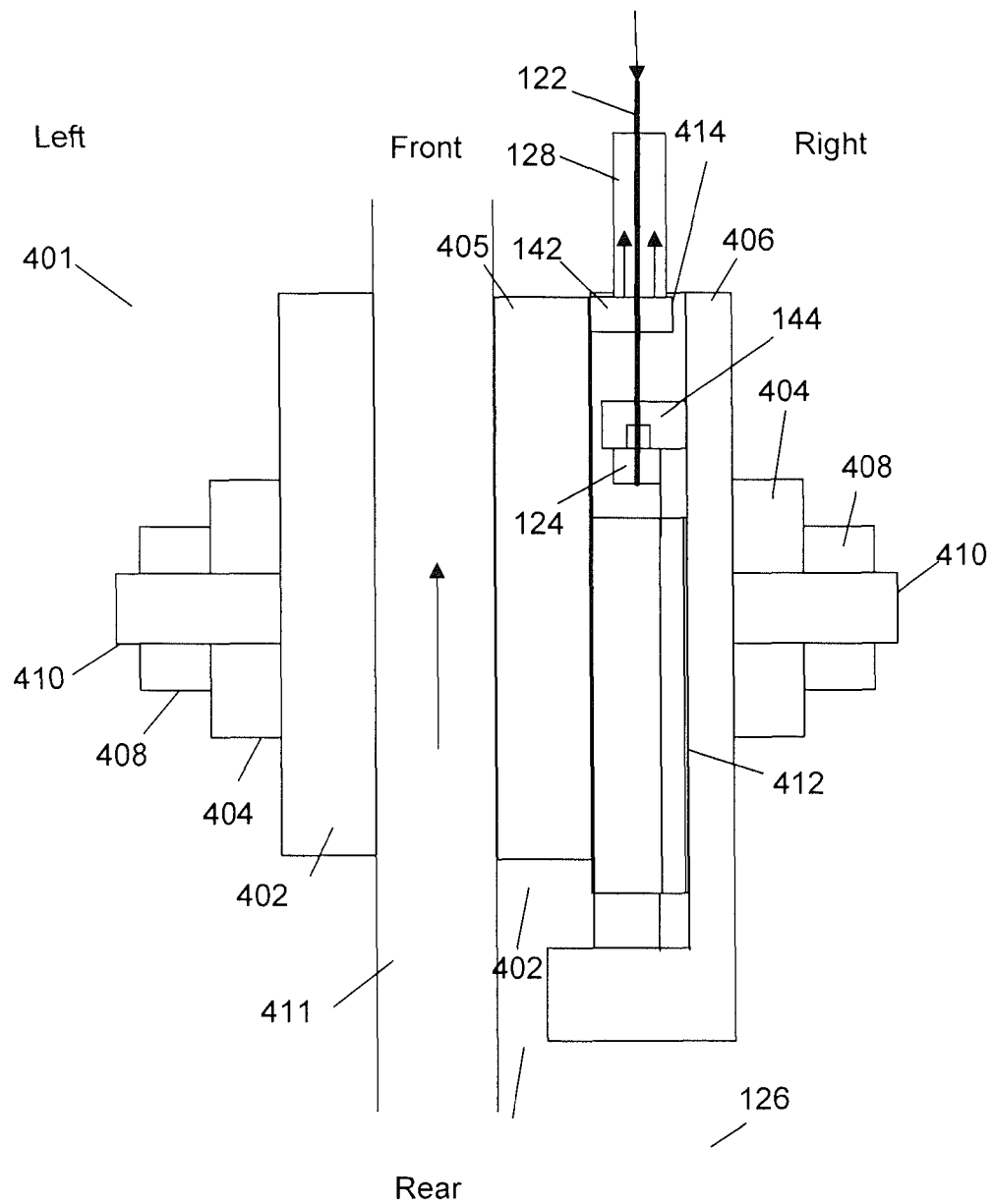

With reference to FIG. 9, when the first brake is actuated, the brake pad assembly 405 is pressed against the moving rim 411 and the friction force causes the brake pad assembly 405 to move forward. This movement causes the brake cable housing 128 to be compressed. Although the guide 406 and brake cable 128 may not move, the movement of the brake cable housing 128 results in tension in the brake cable 122 which actuates the second brake. The pushing force on the brake cable housing 128 due to the braking friction is greater than the front brake spring force, the brake cable housing 128 is compressed and the front brake cable 122 is pulled in tension. If the rim 411 stops rotating due to a lack of contact with the road, the slider 405 and brake cable housing 128 will no longer be pushed forward. This reduced force in the brake cable 122 and brake cable housing 128 will reduce the braking force on the second brake until the rim 411 regains traction on the road and starts rotating again. The brake configuration illustrated in FIGS. 8 and 9 may not require a noodle to direct the second brake cable 122 from the rear brake to the front brake.

Figure 10:
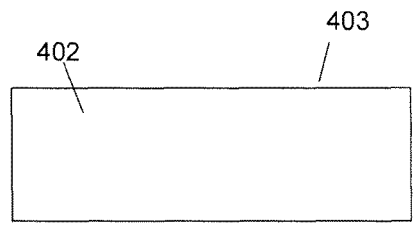
FIGS. 10-14 illustrate views of a slider assembly according to an embodiment of the invention.
Figure 11:
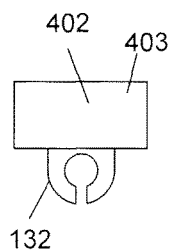
Figure 12:
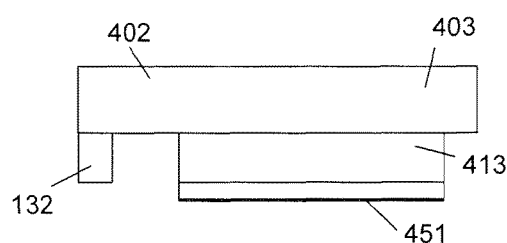
Figure 13:
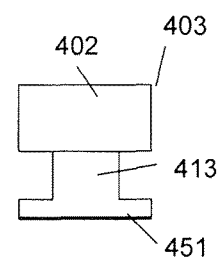
Figure 14:
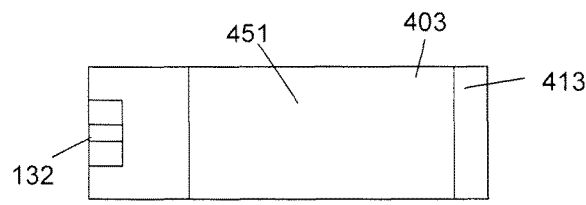

In an embodiment, the inventive brake pad mechanism assemblies can be a direct replacement for the existing brake pads. The brake pad can be very similar to the known brake pads. FIGS. 10-14 illustrate different views of an embodiment of the slider assembly 403. FIG. 10 illustrates an inner side view, FIG. 11 illustrates a back view, FIG. 12 illustrates a top view, FIG. 13 illustrates a front view and FIG. 14 illustrates an outer side view of the slider assembly 403. Rather than being molded around a brake support structure or placed in a brake shoe, the brake pad 402 can be molded around a slider 403 which slides within a guide. In other embodiments, the brake pad 402 can be inserted into a brake shoe that holds the brake pad in the required position on the slider assembly 403.

The slider assembly 403 can include a slide portion 413 that engages a corresponding slot in the guide. In this embodiment, the slide portion 413 can have a "T" shape. In other embodiments, the slide portion 413 can be any other shape that can be held in a corresponding slot. The slider assembly can also include an open hole coupling mechanism 132 that can be securely connected to the brake actuator. Because the slide portion 413 is in physical contact with the guide, a film or sheet or the entire slider can be made of a lubricious material such as: Nylatron, Teflon, graphite or other low coefficient of friction and high compression strength materials can be attached to the sliding 451 surface(s) of the slider 403 and/or guide. In other embodiments, the entire slide portion 413 or the slider assembly 403 can be made of a lubricious material.

The coefficient of friction of the brake pad 402 sliding against the rim can depend upon the brake pad 402 and rim materials. The rim can be made of aluminum, carbon fiber, plastic, titanium, steel, and other alloys. The brake pad 402 can be a plastic, rubber or other high coefficient of friction material that can molded around a slider 403 or attached in any other suitable manner to a brake support structure. The brake support structure prevents the brake pad 402 from deforming while it is compressed against the rim. The slider brake support structure and brake pad 402 can also be configured to apply uniform pressure to the contact areas where the brake pads contact the rim or other braking surface such as a disk brake.

Figure 15:
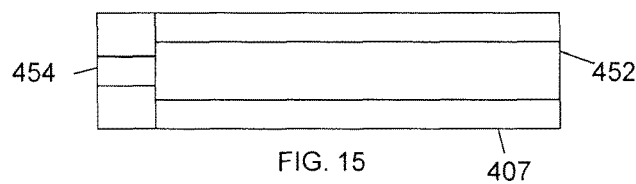
FIGS. 15-19 illustrate views of a guide according to an embodiment of the invention.
Figure 16:
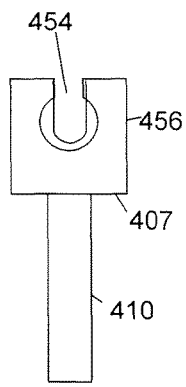
Figure 17:
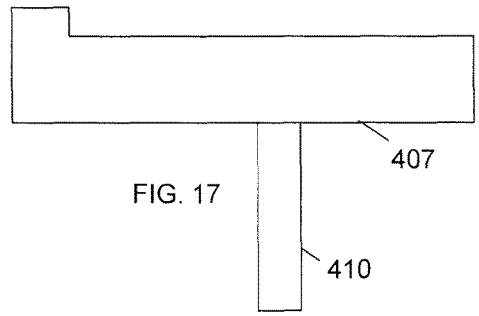
Figure 18:
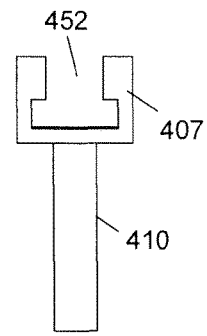
Figure 19:
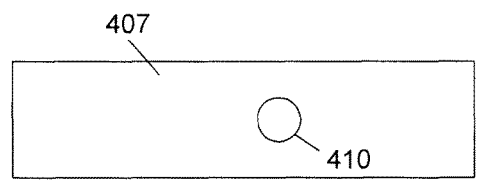

Different views of an embodiment of the guide 407 are illustrated in FIGS. 15-19. FIG. 15 illustrates an inner side view, FIG. 16 illustrates a back view, FIG. 17 illustrates a top view, FIG. 18 illustrates a front view and FIG. 19 illustrates an outer side view of the guide 407. The guide also has a groove 452 that the sliding portion of the slider assembly moves within. The rear end of the guide 407 can include a slot 454 and a recessed area 456 for holding an end of a noodle or a brake cable housing. The guide 407 can include a mounting rod 410 to secure the guide 407 to a brake arm. The rod 410 can be cylindrical and have a smooth surface. In other embodiments, the outer diameter of the rod 410 may be threaded. In other embodiments, any other type of attachment mechanism can be used to secure the brake to the guide. For example, the guide 407 may have a threaded hole which allows a bolt to be screwed into the hole to secure the guide to the brake. The assembled brake pad assembly with the slider assembly 403 and the guide 407 can be similar in size to a conventional brake pad.

Figure 20:
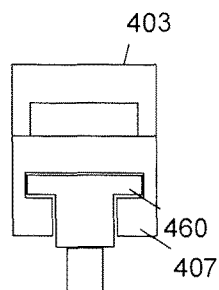
FIGS. 20-22 illustrate cross section views of the slider assembly and guide according to different embodiments of the invention.
Figure 21:
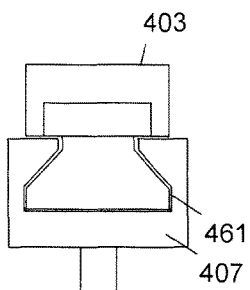
Figure 22:
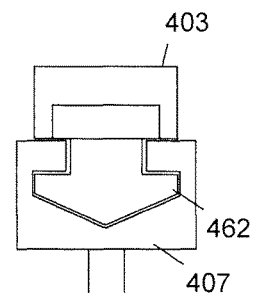

FIGS. 2-19 illustrate the slider as having an inverted "T" portion which slides within a corresponding inverted T shaped groove formed in the guide. The sliding portions can be the lower flat portion of the inverted T as well as the surfaces of the guide that are closest to the slider. Each of these sliding surfaces can be used with a lubricious material to minimize the sliding friction. In other embodiments, any other sets of sliding surfaces can be used as shown in the exemplary cross section illustrations. Various other configurations are available for the slider and guide as shown in FIGS. 20-22. FIG. 20 illustrates a cross section of an embodiment of the brake pad assembly having a guide with a "T" cross section groove 460 and a slider assembly having a corresponding "T" shaped groove 465. FIG. 21 illustrates a guide 407 having a tapered groove 461 and a slider assembly having a corresponding sliding portion 466. FIG. 22 illustrates a guide having a "V" groove 462 and a slider assembly having a corresponding slider portion. Various other slider groove combinations are contemplated.

Figure 23:
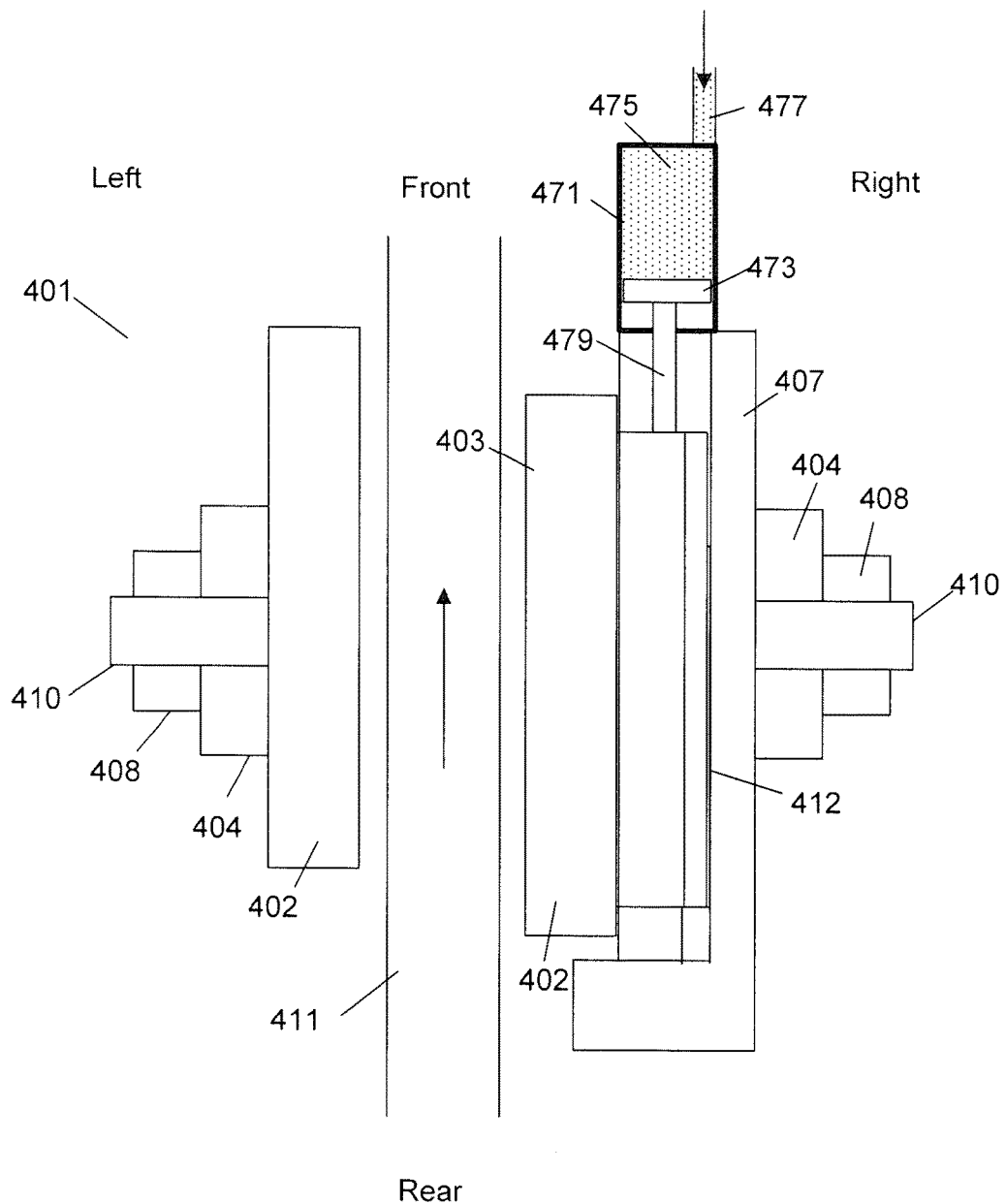
FIGS. 23 and 24 illustrate top views of another brake according to an embodiment of the invention.
Figure 24:
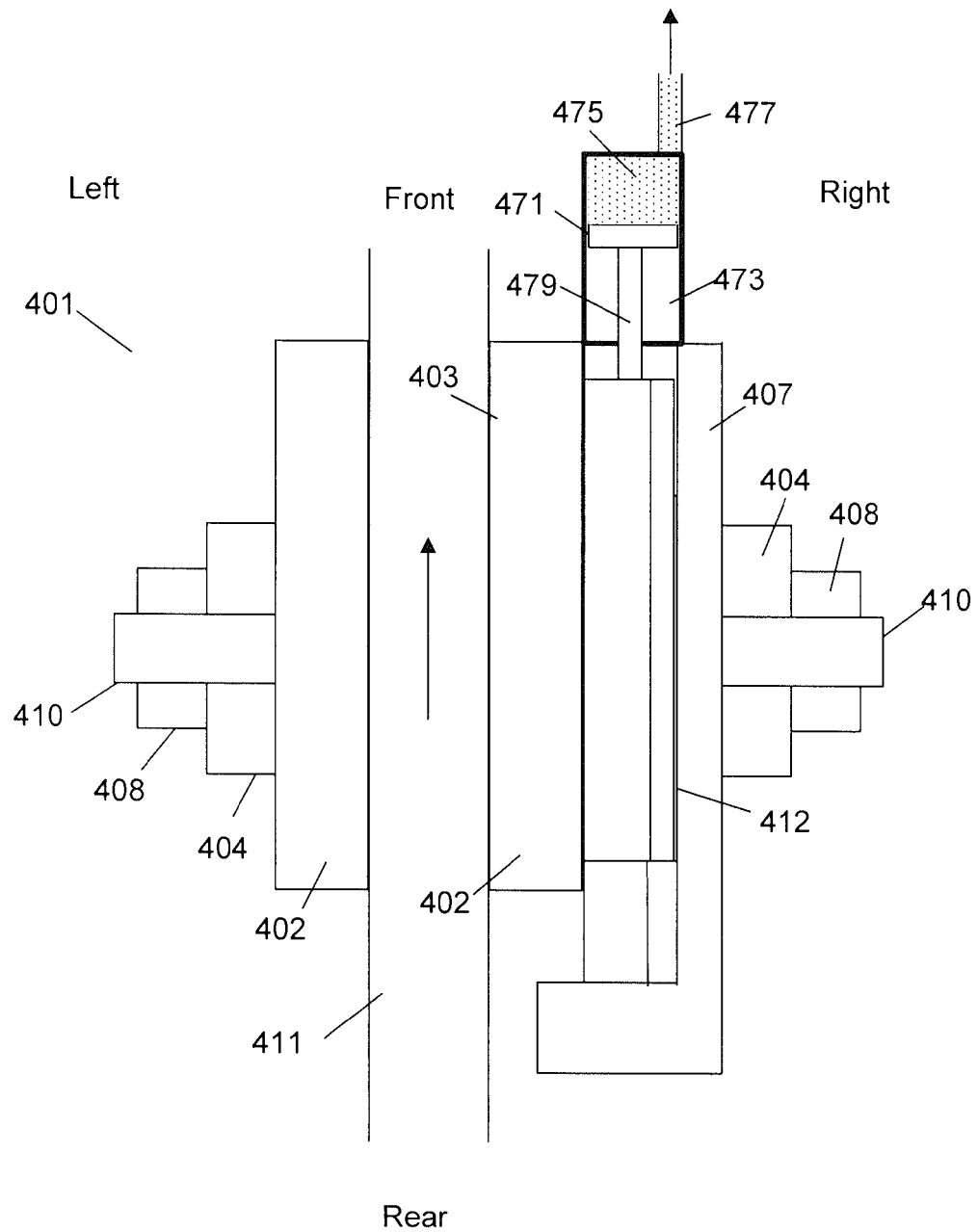

With reference to FIGS. 23 and 24, in other embodiments, it is also possible to apply the described rear brake assembly to a hydraulic brake system. Rather than a cable pulling system, the rear brake assembly can be coupled to a hydraulic cylinder 471 filled with hydraulic fluid 475. The cylinder 471 can be coupled to the guide 407 and the slide assembly 403 can be coupled to a piston rod 479 that is attached to a piston 473 that can move within the cylinder 471. One end of the brake hydraulic tubing 477 is coupled to a cylinder 471 and the opposite end is coupled to the second brake. With reference to FIG. 23, a spring in the second brake pressurizes the hydraulic fluid 475 pressing the piston 473 towards the back of the cylinder 471. The hydraulic brake system can be a disc brake or a rim brake (cantilever, V-brake, etc.) In the normal position, the brake shoe 402 is not in contact with the rim 411 or disk brake.

With reference to FIG. 24, in the braking position the brake pads 402 are pressed against the moving rear rim 411 or disk brake. The slider 403 moves forward due to the friction of the brake pad 402 against the rim 411. The slider 403 pushes the rod 479 and the piston 471 within the cylinder 471 pressuring the hydraulic fluid 475. The pressurized hydraulic fluid 475 exits the cylinder 471 and flows through the hydraulic tubing 477 to actuate the second hydraulic brake. If the rim 411 stops rotating due to a lack of contact with the road, the friction force and the force moving the slider 403 forward will decrease. The forces on the piston 473 will decrease and the hydraulic fluid 475 pressure will also decrease. This reduced hydraulic fluid 475 pressure in the hydraulic tubing 477 will reduce the braking force on the second brake until the rim 411 regains traction on the road and starts rotating again.

Figure 25:
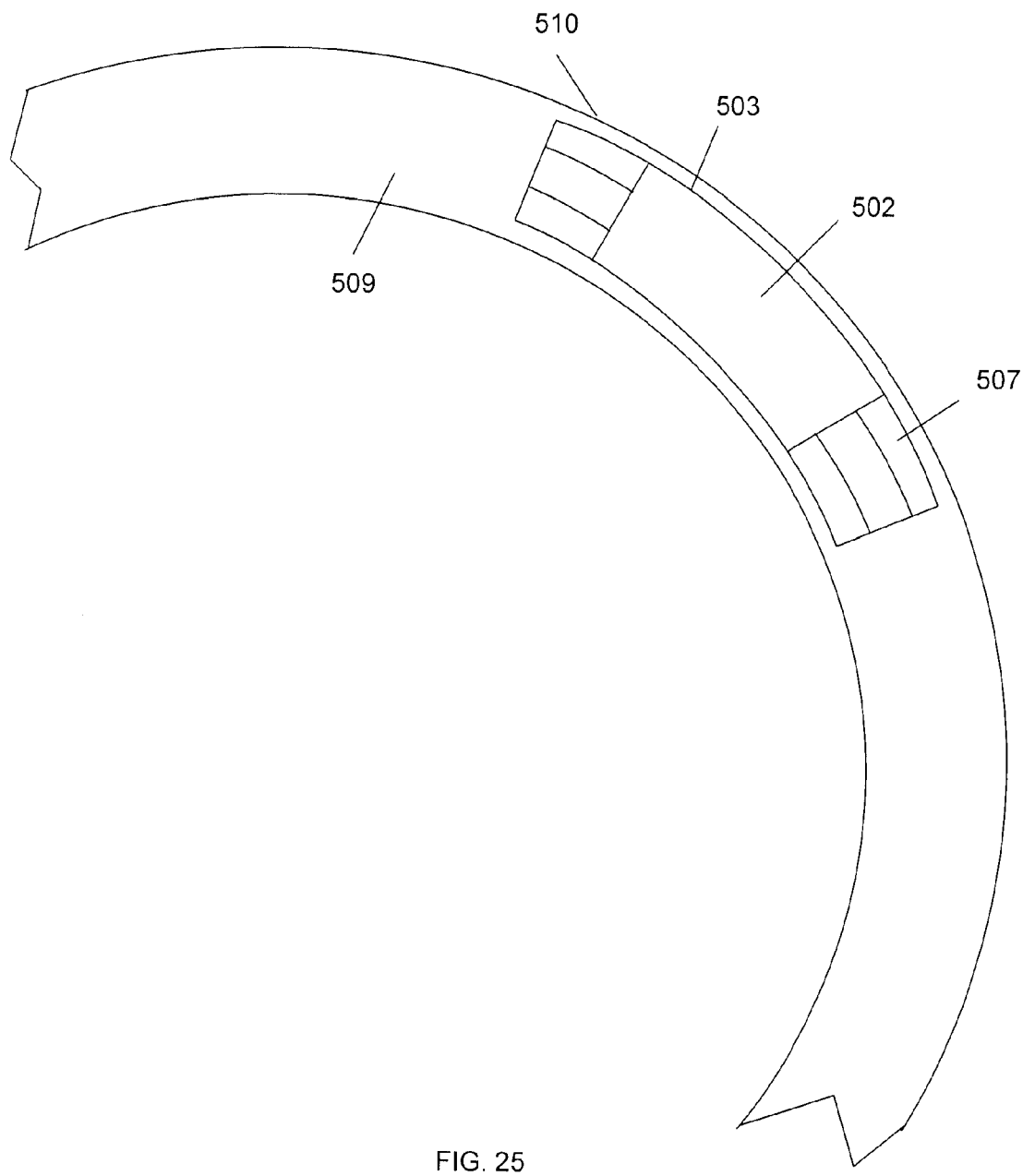
FIG. 25 illustrates a side view of the slider assembly and guide according to a disk brake embodiment of the invention.

With reference to FIG. 25 an embodiment of the brake pad assembly 510 is illustrated. In many bicycles, hydraulic systems are used with disk brakes. Because the disk brakes use a disk rotor 509 rather than a rim as the braking surface, the brake pad 502 can be any geometric shape that provides sufficient surface area to stop the rotation of the disk rotor 509. Because the disk brake pad 502 is located much closer to the center of rotation, the radial position of the disk brake pad 502 may shift as the slider 503 moves within the guide 507 if the path is linear. In an embodiment, the slider assembly 503 and guide 507 can be configured with an arched path that matches the disk rotor. This configuration may allow the disk brake pad 502 to maintain a constant radial position against the brake rotor 509 regardless of the position of the slider assembly 503 within the guide 507. In the disk brake embodiment, the second brake actuator can be a brake cable in a brake cable housing, a hydraulic system or any other braking mechanism that can be actuated by the movement of the slider assembly 503 in the guide 507.

In other embodiments, the brake shoe slider assembly structure can be used for various other purposes. For example, the brake shoe slider assemblies can be coupled to springs which can provide smoother braking actuation. In this embodiment, both brake shoes of a brake mechanism can have brake shoe/slider assemblies that move within guides on opposite sides of the rim. In the normal open position, the springs are fully extended and the sliders are towards the back of the guides. When the brake is actuated, the brake pads are compressed on opposite sides of the rim and the brake pad/slider assemblies are moved in the guides to compress the springs. This spring motion can provide more uniform braking. If there are rough spots on the rim, the brake pad will have a higher coefficient of friction and tend to compress the spring more. If there are smoother sections of the rim, the coefficient of friction will decrease and the spring can expand. The compression of the spring will tend to absorb the braking force and the spring extension will tend to release the braking force. The overall effect is a smoother braking feel for the rider.

Figure 26:
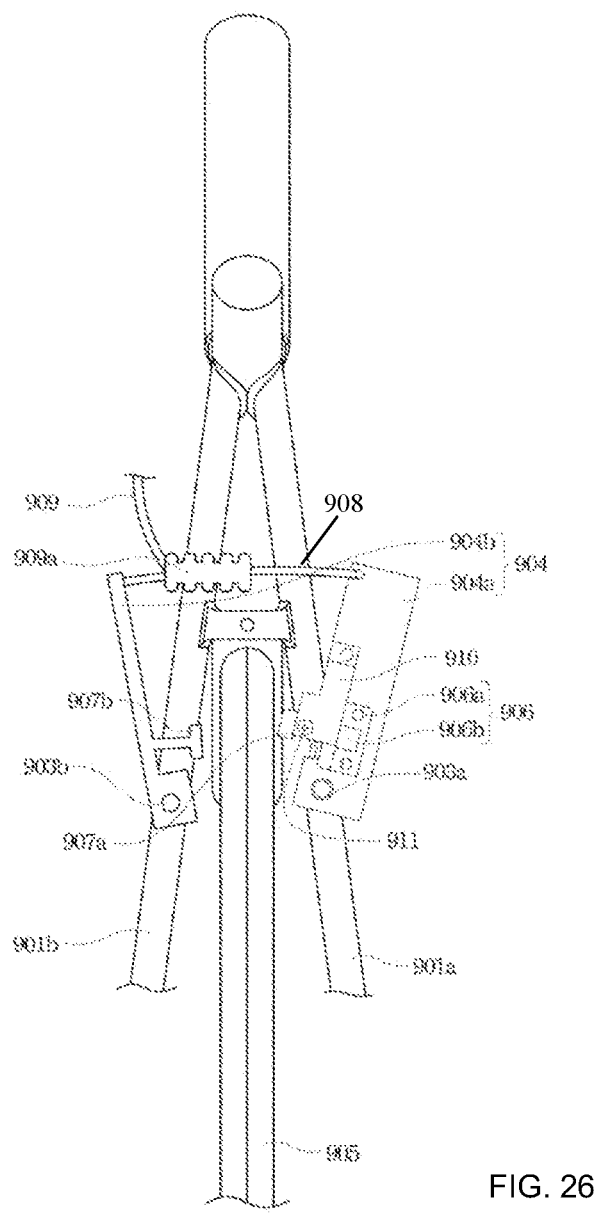
FIG. 26 illustrates a rear view of a released brake and a second brake actuator.
Figure 28:
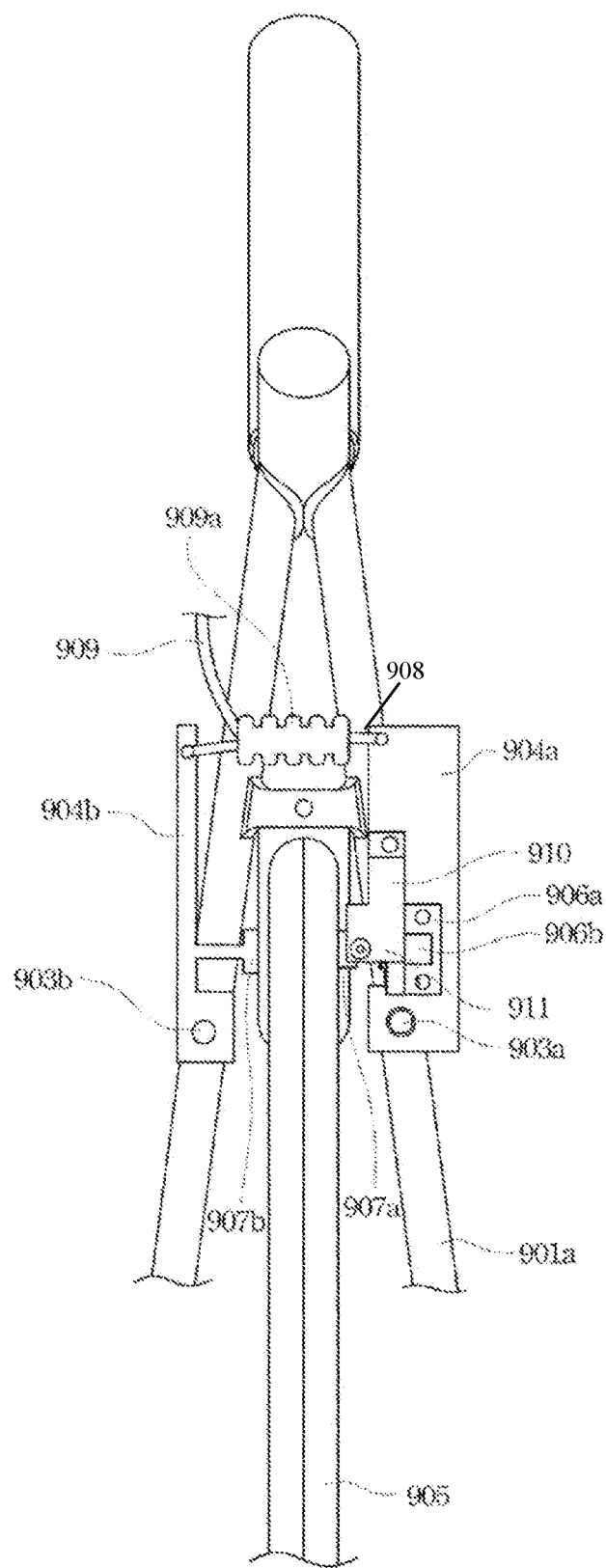
FIG. 28 illustrates the rear view of the actuated brake and second brake actuator.

FIGS. 26 and 28 respectively illustrate a rear cantilever brake and a transmission device according to another embodiment of this invention. FIG. 26 illustrates the rear view of a cantilever brake in the open position with the brake pads 907a, 907b away from the wheel 905. FIG. 28 illustrates the rear cantilever brake in the actuated position with the brake pads 907a, 907b against the wheel 905. In this embodiment, a transmission device is also integrated into the cantilever type brake. A rear cantilever brake 904 can include two brake arms 904a, 904b and the second brake actuator brake assembly 906 can be integrated into either one or both of the two brake arms 904a, 904b. The brake arm 904a can be pivotally connected with a seat stay 901a which is part of the bicycle frame and the brake arm 904a can rotate about a pivot axis 903a. The brake arm 904b can be pivotally connected with a seat stay 901b and the lower end can rotate about a pivot axis 903b. A first brake actuator can be a first brake cable 908 that slides within a noodle 909. The first brake cable 908 can be coupled to the first brake arm 904a and the noodle 909 can be coupled to the second brake arm 904b by a bracket 909a. When actuated, the brake arms 904a, 904b are squeezed towards each other and this inward rotation actuates their respective brake pads (907a, 907b) to be pressed against the rear wheel 905. The brake arms 904a, 904b can each be coupled to springs which rotate the brake arms 904a, 904b away from the wheel 905 as illustrated in FIG. 26 when the first brake cable 908 is not actuated by a brake lever.

With reference to FIG. 28, when the first cantilever brake 904 is actuated, the two brake arms 904a, 904b are pulled towards each other by the movement of the brake cable 908 and the noodle 909, such that their respective brake pads 907a, 907b are pressed against the wheel 905 to slow the rotation of the wheel 905. The second brake actuator device 906 can consist of a guide 906a and a slider 906b. The friction force of the brake pad 907a against the rotating wheel 905 causes the slider 906b to move within the guide 906a to move the second brake actuator. When the brake lever is released, the two brake arms 904a, 904b of the first cantilever brake 904 return to their respective open positions as illustrated in FIG. 26 by the torsion spring force.

Figure 27:
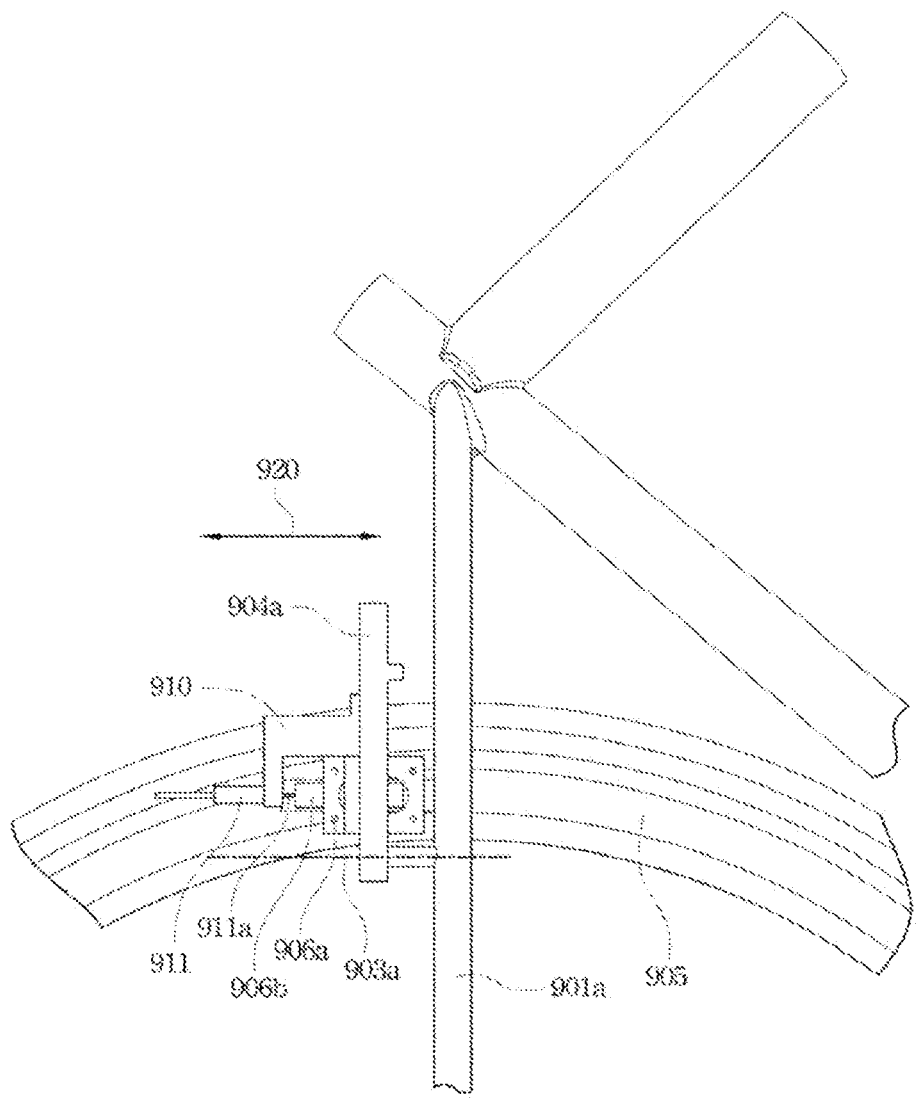
FIG. 27 illustrates a side view of the released brake and the second brake actuator.
Figure 29:
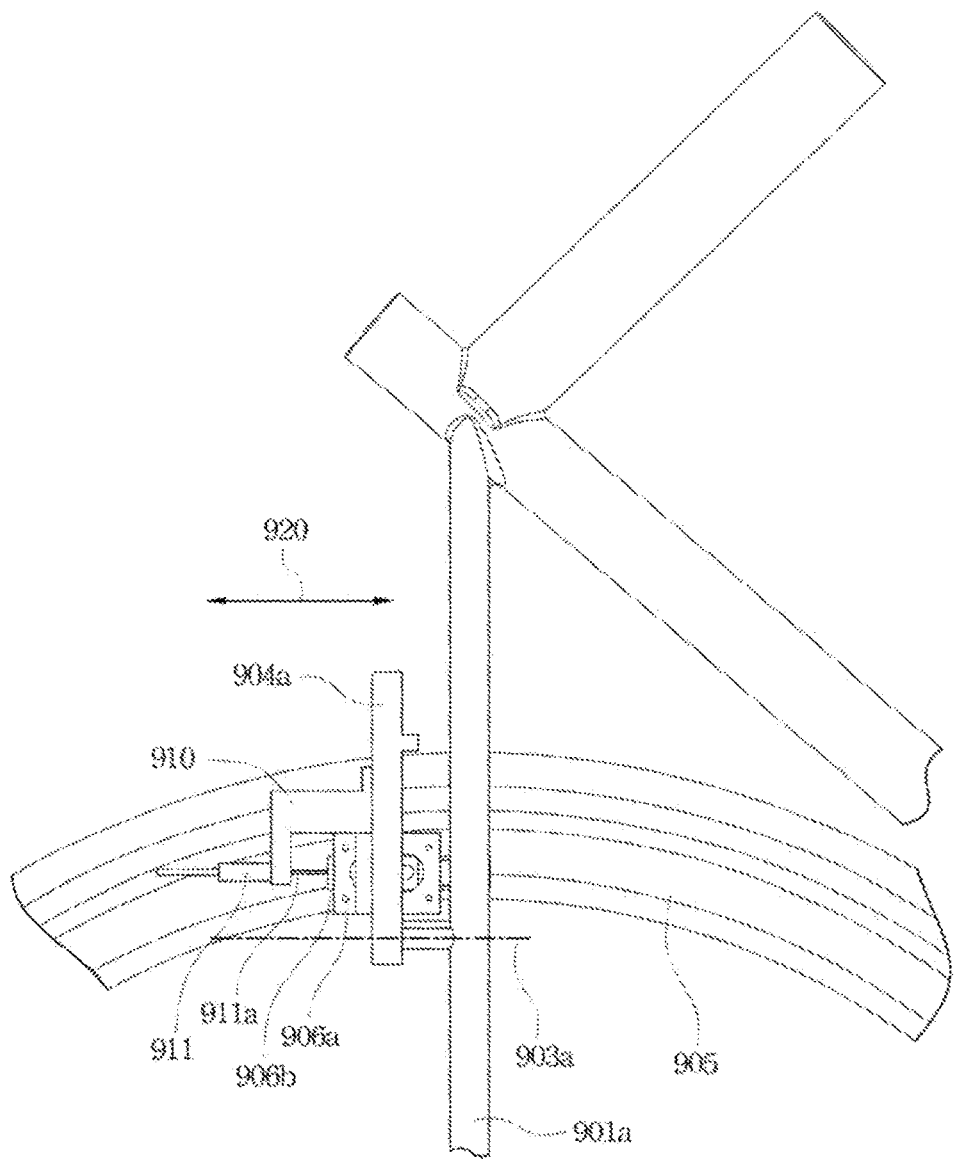
FIG. 29 illustrates a side view of the actuated brake and second brake actuator.

FIG. 27 illustrates a side view of the rear cantilever brake and the transmission device as illustrated in FIGS. 26 and 29 illustrates side views of the first brake and the second brake actuator as illustrated in FIG. 28. An operation mechanism of the rear cantilever brake's right half is further described below with reference to FIGS. 27 and 29. In the illustrated embodiment, an L-shaped bracket 910 can be secured to the brake arm 904a and an opposite end of the bracket 910 can be coupled to the second brake actuator which can be a brake cable housing 911 which surrounds the brake cable 911a. The brake cable 911a can be coupled to the slider assembly 906b and the brake pad 907a can be a component of the slider assembly 906b. The slider assembly 906b can be slidably connected to the guide 906a which allows the slider assembly 906b to slide along a direction 920. The direction 920 is generally in parallel with the pivot axis 903a.

When the second brake actuator 906 is not actuated as illustrated in FIG. 27, the brake pad 907a is not in contact with the wheel 905 and the brake cable 911a is not pulled by the slider assembly 906b to actuate a second brake. In an embodiment, the first bake can be the rear brake and the second brake can be the front brake 106 of a bicycle as illustrated in FIG. 2.

With reference to FIG. 29, when the second brake actuator 906 is actuated, the second brake cable 911a is pulled by the slider assembly 906b due to the friction of the brake pad 907a against the wheel 905. The second brake cable 911a can be coupled to a second brake which is actuated by the pulling of the second brake cable. When the first brake is released and the second brake actuator 906 is released, the slider assembly 906b is pulled by the brake cable 911a towards the brake cable housing 911 and the second brake actuator returns to an original position as illustrated in FIG. 27.

Figure 30:
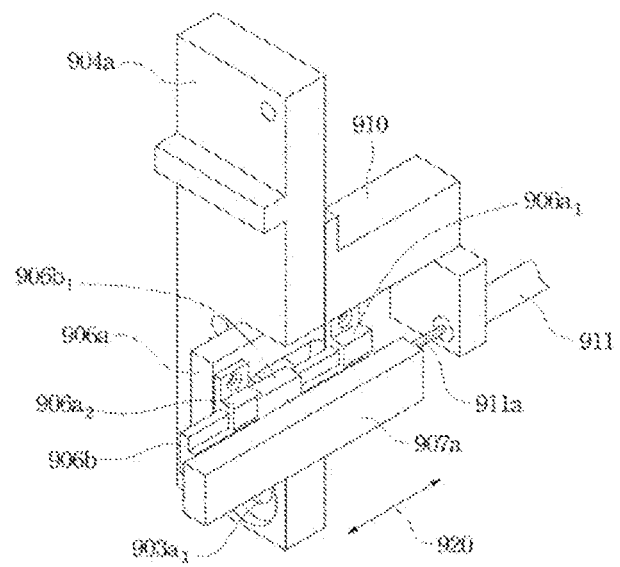
FIG. 30 illustrates a perspective view of the cantilever brake arm, slider assembly and guide.
Figure 31:
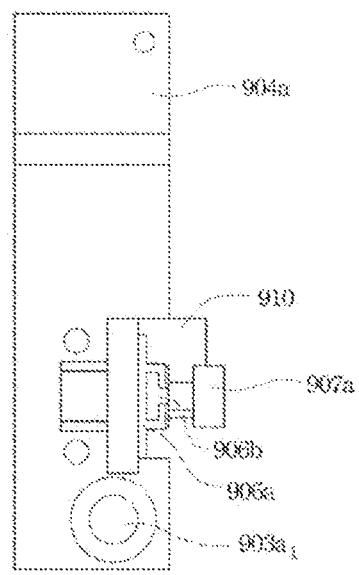
FIG. 31 illustrates a rear view of the cantilever brake arm, slider assembly and guide.

FIG. 30 illustrates a perspective view of a slider assembly 906b, guide 906a and brake arm 904a and FIG. 31 illustrates a front view of the slider assembly 906b, guide 906a and brake arm 904a. As shown in FIG. 31, the brake pad 907a is secured to the slider assembly 906b and the guide 906a is fastened to the brake arm 904a. The slider assembly 906b and brake pad 907a are slidably connected with the slider guide 906a. The guide 906a can have two stop members ($906a_1$ and $906a_2$) that restrict the movement of an extension member $906b_1$ of the slider assembly 906b such that the slider assembly 906b may only slide back and forth along the direction 920 within a limited region of the guide 906a. With this limited movement region, the slider assembly 906b may not overly pull the brake cable 911a beyond a predetermined range of motion.

The guide 906a and slider assembly 906b can be made from metallic materials, which could provide low friction sliding surfaces. In an embodiment, the slider assembly 906b is made from brass or other alloy of copper, and the slider guide 906a is made from bronze or other alloy of copper. The guide 906a may be oil-impregnated such that the slider assembly 906b can be slid along the slider guide 906a with an even low friction. In other embodiments, the guide 906a and slider assembly 906b can be made from high strength lubricious plastic materials.

Figure 32:
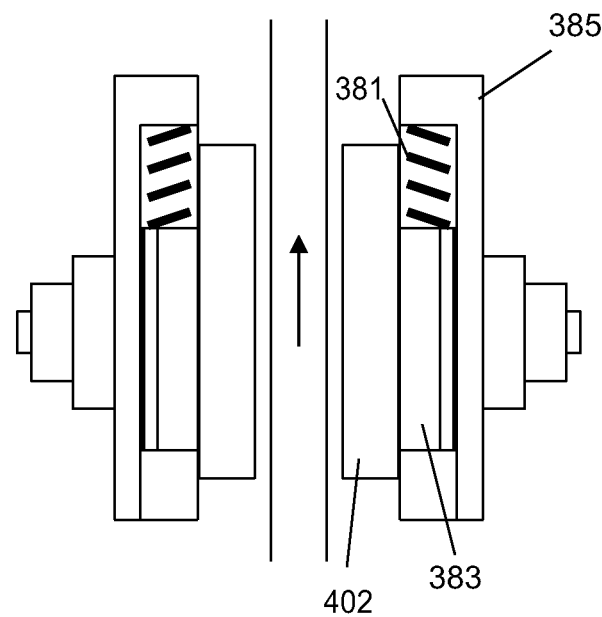
FIGS. 32-33 illustrate top views of a brake according to an embodiment of the invention.
Figure 33:
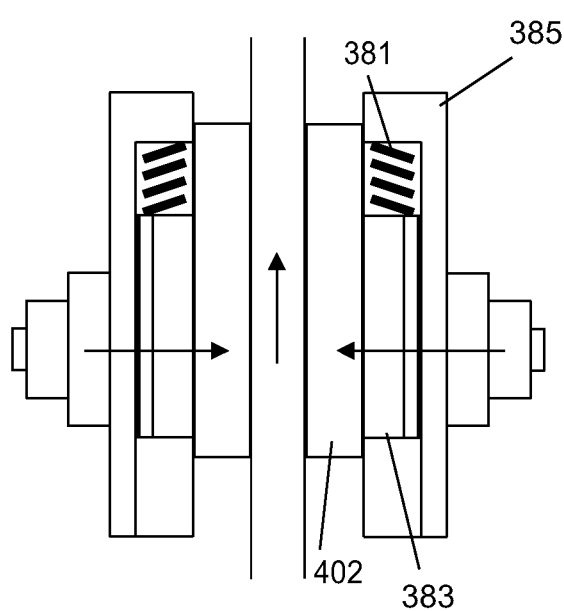

In other embodiments, various other functional mechanisms can be coupled to the inventive brake pad, slider and guide assemblies. With reference to FIGS. 32 and 33, an embodiment of the brake pad assembly includes springs 381 that resist the movement of the slider assemblies 383 in the guides 385 during braking. FIG. 32 illustrates the brake 380 in the open position with brake pads 402 pulled away from the rotating rim 411. FIG. 33 illustrates the brake 380 in the braking position with the brake pads 402 pressed against the rotating rim 411. The friction force of the brake pads 402 against the rim 411 causes the springs 381 to be compressed. The spring movement can prevent the brake 380 from locking up the rotating rim 411 if the rider actuates the brake 380 with too much force. The compression of the springs 381 can smooth the braking forces applied to the rim 411.

In still other embodiments, the inventive system can be used for other purposes. For example, with reference to FIGS. 34 and 35, the system can be a component of an electrical system. A piezo electric mechanism 391 can be coupled to the slider assembly 393 and guide 395. The piezo electric mechanism 391 can produce electricity when compressed. An LED 397 can be coupled to the piezo electric mechanism 391 by electrical conductors 396 such as wires. In the open position illustrated in FIG. 34, the brake pads 402 are away from the rim 411 or disk and the piezo electric mechanism 391 does not produce electricity and the LED 397 is not illuminated. With reference to FIG. 35, the slider assembly 393 compresses the piezo electric mechanism 391 which generates electricity which can be coupled to the LED 397. The LEDs 397 may face towards the back of the bicycle so that when the bicycle brakes are applied, the illuminated red LEDs can indicate that the bicycle brakes are applied.

Figure 34:
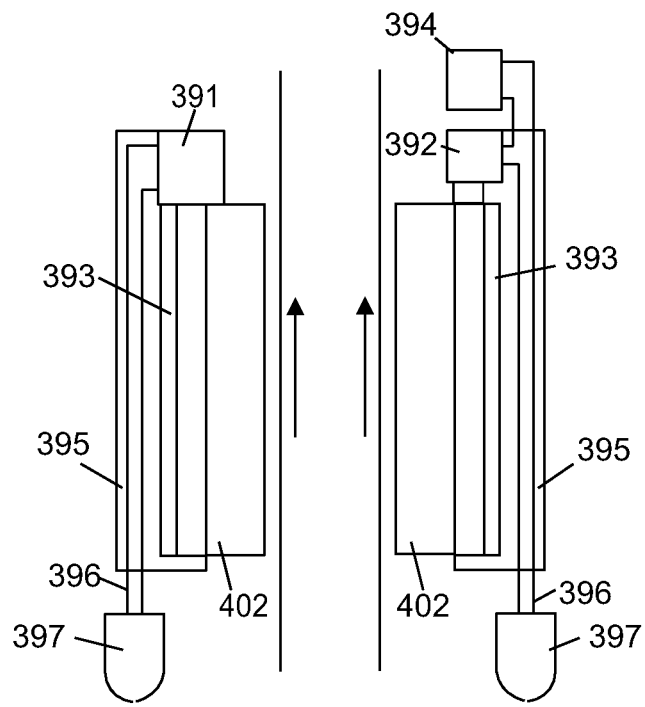
FIGS. 34-35 illustrate top views of a brake coupled to LEDs according to another embodiment of the invention.
Figure 35:
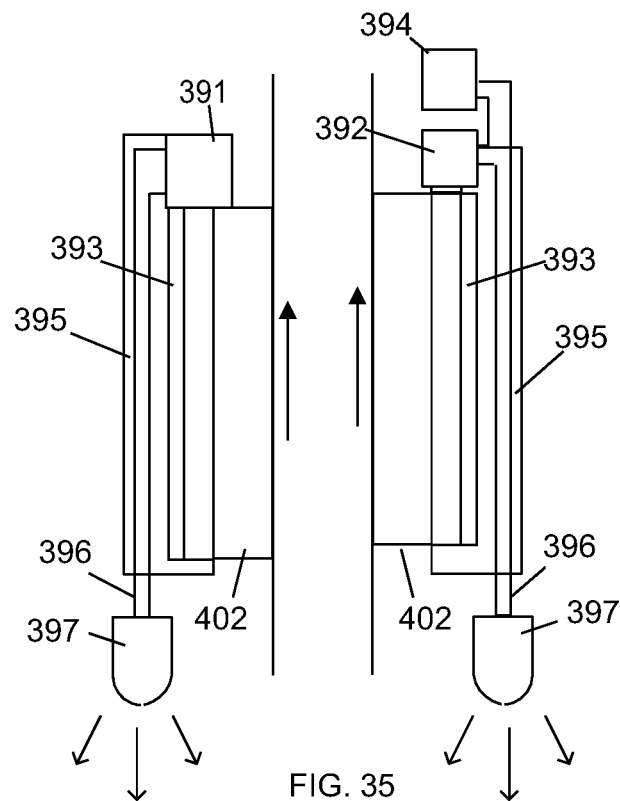

With reference to FIG. 34, in other embodiments, the slider 393 can be coupled to a switch 392 and a battery 394. When the brake is open, the switch 605 can be open and the battery 394 can be disconnected from the LED 397 which will not be illuminated. With reference to FIG. 35, when the brake is actuated, the braking can cause the brake pad 402 to close the switch 392 which can connect the battery 394 to the LED 397 which then produces light. In an embodiment, the LEDs 397 can be red in color and may be facing the back so they are visible to people behind the bicycle. The illuminated red LEDS can indicate that the bicycle is braking. In other embodiments, the LED can be white or any other color and can be pointed in any direction. The system can be used as a supplemental power source for the headlight. When the brakes are applied, the piezo electric switch can increase the power output of a headlight. Thus, when riding normally, the lights can be lower and when the brakes are applied, the light power can be increased for higher visibility at a stop sign or during braking.

Figure 36:
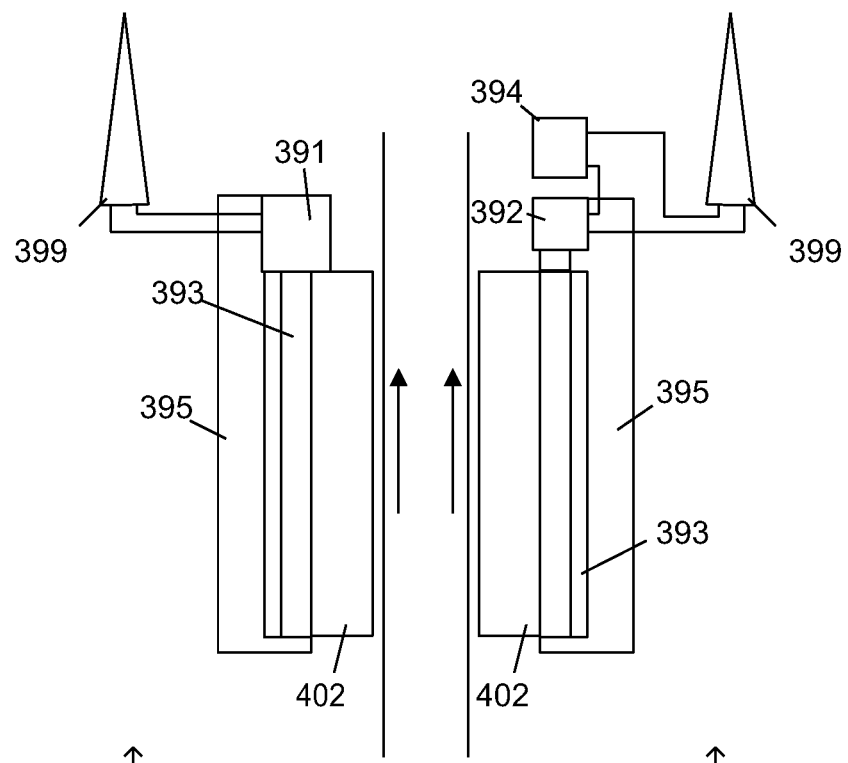
FIGS. 36-37 illustrate top views of a brake coupled to brake signal transmitters according to another embodiment of the invention.
Figure 37:
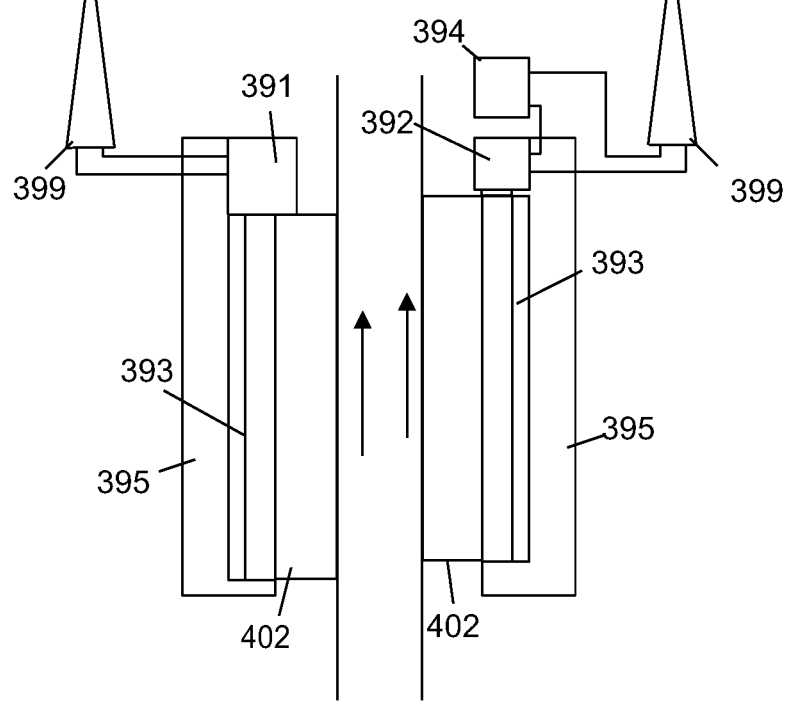

In an embodiment with reference to FIGS. 36 and 37, the inventive brake system can be coupled to a brake signal transmitter 399. The piezo electric mechanism 391 can be coupled to a brake signal transmitter 399. With reference to FIG. 36, when the brake is open, the piezo electric mechanism 391 does not produce electricity and the brake signal transmitter 399 may not transmit an output signal. With reference to FIG. 37, when the brakes are applied, the piezo electric mechanism 391 can be compressed and emit an electrical signal which is used by the brake signal transmitter 399 to emit a brake signal.

In other embodiments, the brake signal transmitter 399 can be connected to an electrical switch 392, a power supply 394 and brake signal transmitter 399 which can be an RF transmitter or any other signal output device. With reference to FIG. 36, when the brake is open, the electrical switch 392 is disengaged and the electrical power is not transmitted from the power supply 394 which can be a battery to the brake signal transmitter 399. With reference to FIG. 37, when the brakes are actuated, the brake pad 402 can actuate the switch 392 causing electrical power to be transmitted from the power supply 394 to the brake signal transmitter 399.

Figure 38:
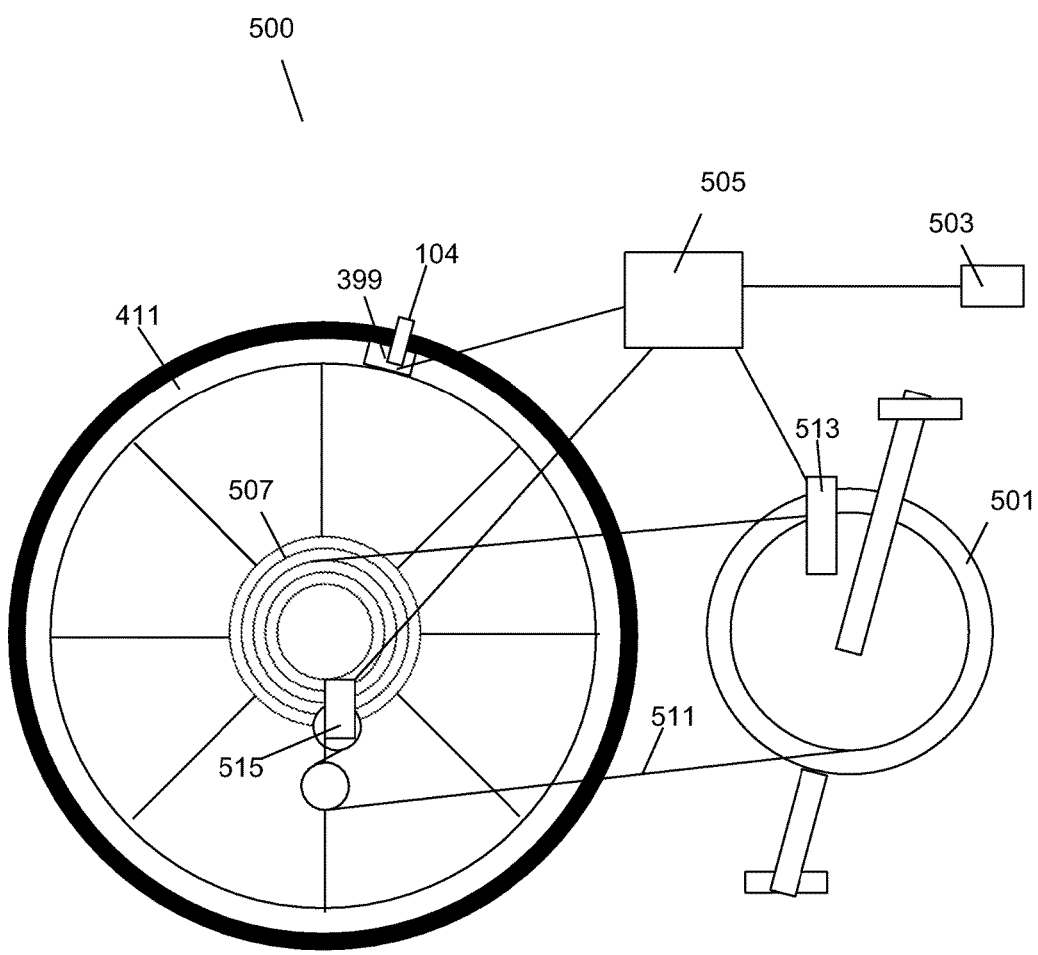
FIG. 38 illustrates a side view of a brake signal transmitter and an electronic shifting system.

In other embodiments, the brake signal can be coupled to an electronic gear shifting system. With reference to FIG. 38, a bicycle gearing system 500 is illustrated. Bicycles typically include multiple gears that control the ratio of pedal rotation of a crank 501 to rear wheel 411 rotation. Lower gears provide lower rotation of the rear wheel 411 per each crank 501 rotation and higher gears provide a higher rotation of the rear wheel 411 per crank 501 rotation. The number of gears available is typically the number of gears on a rear cluster 507 that is coupled to the rear wheel 411 times the number of gears 509 on a front crank 501. For example, in the illustrated embodiment, the rear cluster 507 can have 5-11 gears and the front crank 501 can have 2 or 3 gears. A bicycle having a 5 gear rear cluster 507 and a three gear crank 501 will have a total of 15 gears. A chain 511 can run over any combination of the front and rear gears to provide different gearing to the bike. By changing the position of the chain 511 on the rear cluster 507 and the crank 501, the rider can change the rotational ratio of the cranks and the rear wheel. In an embodiment, the rider can select a gear through a shift controller 503 and the electronic system 505 will shift the chain 511 to the selected gears by adjusting a front derailleur 513 and a rear derailleur 515. However, in order to properly shift gears, the rider must be pedaling since shifting of the chain 511 cannot occur when the crank 501 is not rotating.

The rider is typically not pedaling when the brakes 104 are applied. The brake can be coupled to a brake signal transmitter 399 which can transmit a brake signal to the electronic system 505 when the brakes are applied. The brake actuation signal can indicate that the crank 501 is not rotating and the electronic system 505 should not attempt to shift the gears by controlling the front derailleur 513 or the rear derailleur 515. In an embodiment, the electronic system 505 can delay the shift until the brakes have been released and the brake signal transmitter 399 does not emit the brake signal.

In other embodiments, the inventive braking system 500 can be used with an electronic gear shifting system that can be configured to adjust the gearing ratio lower for hills and slower riding speeds and increase gearing ratio for descents and faster riding speeds. The application of the brakes can be used as a gear shift signal to automatically make adjustments to the gear ratio. For example, when a rider is braking on a flat section and the rider applies the brakes, this braking is usually in response to a stop sign or light. If the rider slows his or her speed significantly, the electronic shifting system can adjust the gearing to be lowered so that the rider will be able to pedal the bicycle from a stopped position. It can be very difficult to start moving a bicycle that is in a high gear when the bicycle is stationary.

In an embodiment, it may be possible to shift gears based upon the actuation and duration of the braking. If the brakes are applied the system may downshift and the number of gears shifted may be proportional to the force and duration of the braking. A long and hard braking can cause the gears to shift to a lower gear so that the rider can be in a low gear when pedaling resumes. Thus, a short and light brake actuation may result in a single lower gear shift. In contrast, a longer and harder brake actuation may result in a multiple gear shift to a significantly lower gear. In an embodiment, it may be possible to transmit signals to the shift mechanism through the brake levers. For example, the decrease in the gear shift can be indicated by the number of brake taps, two taps of the brake lever can result in downshifting by two gears. Similarly, five taps of the brake lever can result in a five gear downshift.

After the inventive brake pad assemblies have been used for a significant period of time, the brake pads will need to be replaced. In an embodiment, the present invention can be directed towards the repair kit for the brake pad assembly 403 illustrated in FIGS. 10-14. If the only worn component is the brake pad 402, a basic repair kit may only include the brake pad 402. The user can remove the worn brake pad 402 from the slider assembly 403 and attach the new brake pad 402 to the slider assembly 403. In some embodiments, a fastener such as a screw may be used to secure the brake pad 402 to the slider assembly 403.

In other embodiments, the brake pad 402 may be integrated into the slider assembly 403 and when the brake pad 402 needs to be replaced, the slider assembly 403 may also be replaced. In this embodiment, the repair kit may include the slider assembly 403 that includes the brake pad 402. If the actuation of the brake pad assembly 403 has worn the sliding portions of the guide 407 (illustrated in FIGS. 15-19), a repair kit can include both the slider assembly 403 and the guide 407. It is also possible that the lubricious material may need to be replaced periodically. The brake pad assembly may include some spare sliding surface materials which can be used as replacement parts.

The present disclosure, in various embodiments, includes components, methods, processes, systems and/or apparatus substantially as depicted and described herein, including various embodiments, subcombinations, and subsets thereof. Those of skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation. Rather, as the flowing claims reflect, inventive aspects lie in less than all features of any single foregoing disclosed embodiment.

What is claimed is:

1. An apparatus comprising:
a slider assembly having a brake pad and a slide portion, the slide portion having an integrated coupling mechanism that is directly connected to an end of a front brake cable which actuates a front brake of a vehicle, the vehicle having a steering mechanism and the front brake on a front portion of the vehicle;
a guide in direct physical contact with the slider assembly; and
a brake arm coupled to the guide;
wherein the slider assembly, the guide, and the brake arm are components of a rear brake on a rear portion of the vehicle and the brake pad of the slider assembly is pressed against a rotating braking surface and a friction force of the brake pad against the rotating brake surface causes the slide portion to move which actuates the front brake actuator and the rear brake to slow the rotation of a rear wheel of the vehicle and the slide portion of the slider assembly moves within a channel in the guide.

2. The apparatus of claim 1, further comprising:
a lubricious material between the slider assembly and the guide.

3. The apparatus of claim 1 wherein the front brake actuator is coupled to the front brake.

4. The apparatus of claim 1 wherein the rear brake is controlled by a rear brake actuator that includes a rear brake hand lever.

5. The apparatus of claim 1 wherein the rotating braking surface is a rim portion of the rear wheel.

6. An apparatus comprising:
a slider assembly having a brake pad, the slider assembly having an integrated coupling mechanism that is directly connected to an end of a brake cable which actuates a front brake of a vehicle, the vehicle having a steering mechanism and the front brake on a front portion of the vehicle; and
a guide in direct physical contact with the slider assembly;
wherein the slider assembly and the guide are components of a rear brake on a rear portion of the vehicle and the brake pad is pressed against a rotating braking surface and a friction force of the brake pad against the rotating brake surface causes the slider assembly to move which actuates the front brake actuator and the rear brake to slow the rotation of a rear wheel of the vehicle and a slide portion of the slider assembly moves within a channel in the guide.

7. The apparatus of claim 6, further comprising:
a lubricious material between the slider assembly and the guide.

8. The apparatus of claim 6 wherein a slide portion of the slider assembly moves within a channel in the guide.

9. The apparatus of claim 6 wherein the front brake actuator is coupled to the front brake.

10. The apparatus of claim 9 wherein the front brake actuator includes a cable housing surrounding a portion of the cable and the cable housing is coupled to the slider assembly.

11. The apparatus of claim 6 wherein the rotating braking surface is a rim portion of the rear wheel.

\* \* \* \* \*